United States Patent
Xie et al.

(10) Patent No.: US 12,430,829 B2
(45) Date of Patent: Sep. 30, 2025

(54) MULTI-MODAL IMAGE EDITING

(71) Applicant: ADOBE INC., San Jose, CA (US)

(72) Inventors: Shaoan Xie, Pittsburgh, PA (US); Zhifei Zhang, San Jose, CA (US); Zhe Lin, Clyde Hill, WA (US); Tobias Hinz, Campbell, CA (US)

(73) Assignee: ADOBE INC., San Jose, CA (US)

( * ) Notice: Subject to any disclaimer, the term of this patent is extended or adjusted under 35 U.S.C. 154(b) by 329 days.

(21) Appl. No.: 18/057,851

(22) Filed: Nov. 22, 2022

(65) Prior Publication Data
US 2024/0169622 A1   May 23, 2024

(51) Int. Cl.
*G06T 11/60* (2006.01)
*G06T 7/11* (2017.01)
*G06T 11/00* (2006.01)

(52) U.S. Cl.
CPC ............. *G06T 11/60* (2013.01); *G06T 7/11* (2017.01); *G06T 11/001* (2013.01); *G06T 2207/20081* (2013.01); *G06T 2207/20084* (2013.01)

(58) Field of Classification Search
CPC .......... G06T 11/60; G06T 7/11; G06T 11/001; G06T 2207/20081; G06T 2207/20084; G06T 11/00; G06T 7/10; G06T 5/00; G06T 5/60; G06T 7/194; G06N 3/0464; G06N 3/08
See application file for complete search history.

(56) References Cited

U.S. PATENT DOCUMENTS

| | | | | |
|---|---|---|---|---|
| 11,830,159 | B1 * | 11/2023 | Mann | G10L 15/02 |
| 2023/0103638 | A1 * | 4/2023 | Saharia | G06V 10/454 |
| | | | | 382/155 |
| 2024/0161468 | A1 * | 5/2024 | Li | G06V 10/82 |

FOREIGN PATENT DOCUMENTS

| | | | | |
|---|---|---|---|---|
| CN | 116152087 A | | 5/2023 | |
| WO | WO-2023250088 A1 * | 12/2023 | | G06T 3/0093 |
| WO | WO-2024081778 A1 * | 4/2024 | | G06N 3/0455 |

OTHER PUBLICATIONS

Avrahami et al., "Blended Diffusion for Text-driven Editing of Natural Images," 2022 IEEE/CVF Conference on Computer Vision and Pattern Recognition (CVPR), Jun. 18-24, 2022, New Orleans, LA, USA. (Year: 2022).*
1Goodfellow, et al., "Generative Adversarial Networks", Communications of the ACM, vol. 63, No. 11, pp. 139-144, Nov. 2020, 6 pages.

(Continued)

*Primary Examiner* — Devona E Faulk
*Assistant Examiner* — Donna J. Ricks
(74) *Attorney, Agent, or Firm* — F. CHAU & ASSOCIATES, LLC

(57) ABSTRACT

Systems and methods for multi-modal image editing are provided. In one aspect, a system and method for multi-modal image editing includes identifying an image, a prompt identifying an element to be added to the image, and a mask indicating a first region of the image for depicting the element. The system then generates a partially noisy image map that includes noise in the first region and image features from the image in a second region outside the first region. A diffusion model generates a composite image map based on the partially noisy image map and the prompt. In some cases, the composite image map includes the target element in the first region that corresponds to the mask.

18 Claims, 14 Drawing Sheets

(56) References Cited

OTHER PUBLICATIONS

2Avrahami, et al., "Blended Diffusion for Text-driven Editing of Natural Images", arXiv preprint arXiv:2111.14818 [cs. CV] Mar. 28, 2022, 32 pages.
3Ho, et al., "Denoising Diffusion Probabilistic Models", 34th Conference on Neural Information Processing Systems (NeurIPS 2020), Dec. 2020, 12 pages.
4Radford, et al., "Learning Transferable Visual Models from Natural Language Supervision", Proceedings of the 38th International Conference on Machine Learning, PMLR 139, Jul. 2021, 16 pages.
5Rombach, et al., "High-Resolution Image Synthesis with Latent Diffusion Models", arXiv preprint arXiv:2112.10752v2 [cs.CV] Apr. 13, 2022, 45 pages.
6Nichol, et al., "GLIDE: Towards Photorealistic Image Generation and Editing with Text-Guided Diffusion Models", arXiv preprint arXiv:2112.10741v3 [cs.CV] Mar. 8, 2022, 20 pages.
Combined Search and Examination Report dated Mar. 6, 2024 in corresponding United Kingdom Patent Application No. 2314576.6, 7 pages.
Avrahami, et al., "Blended Diffusion for Text-driven Editing of Natural Images", 2022 IEEE/CVF Conference on Computer Vision and Pattern Recognition CVPR) Jun. 18, 2022-Jun. 24, 2022 New Orleans, LA, USA Jun. 18, 2022, 32 pages.
Lugmayr, et al., "RePaint: Inpainting using Denoising Diffusion Probabilistic Models", arXiv preprint arXiv:2201.09865v4 [cs.CV] Aug. 31, 2022, 25 page.
Wang, et al., "Imagen Editor and EditBench: Advancing and Evaluating Text-Guided Image Inpainting ", 2023 IEEE/CVF Conference on Computer Vision and Pattern Recognition (CVPR) Vancouver, BC, Canada Jun. 17, 2023, pp. 18359-18369.
Kim, et al., DiffusionCLIP: Text-Guided Diffusion Models for Robust Image Manipulation, arXiv preprint arXiv:2110.02711v6 [cs.CV] Aug. 11, 2022, 28 pages.

* cited by examiner

MULTI-MODAL IMAGE EDITING

BACKGROUND

The following relates generally to image editing, and more specifically to multi-modal image editing using a machine learning model. Image editing can be accomplished by adding or removing information from an image. An example of an approach to image editing is image inpainting, in which information is removed from an image, the missing information is reconstructed, and the reconstructed information is combined with the remainder of the information in the image to form a new image.

Machine learning models can be used to generate and edit images based on multiple modalities. Diffusion models are a category of machine learning model that generates data based on stochastic processes. Specifically, diffusion models introduce random noise at multiple levels and train a network to remove the noise. Once trained, a diffusion model can start with random noise and generate data similar to the training data.

SUMMARY

Aspects of the present disclosure provide systems and methods for multi-modal image editing. According to an aspect of the present disclosure, a multi-modal image editing system receives an image, a mask, and a text prompt describing an object or background texture to be added to the image as input. The multi-modal image editing system performs image inpainting by replacing a region of the image corresponding to the mask with noise and using a diffusion model to denoise the noisy region based on the mask and the text prompt according to a prediction of what the object or background texture should look like when combined with the image. Because the diffusion model performs the denoising process based on the mask, the text prompt, and a partially noisy input, the multi-modal image editing system is able to output a new image that realistically inpaints the object or background texture to the image in an area delineated by the mask.

A method, apparatus, non-transitory computer readable medium, and system for multi-modal image editing are described. One or more aspects of the method, apparatus, non-transitory computer readable medium, and system include identifying an image, a prompt identifying an element to be added to the image, and a mask indicating a first region of the image for depicting the element; generating a partially noisy image map that includes noise in the first region and image features from the image in a second region outside the first region; and generating a composite image map using a diffusion model based on the partially noisy image map and the prompt, wherein the composite image map includes the element in the first region that corresponds to the mask.

A method, apparatus, non-transitory computer readable medium, and system for multi-modal image editing are described. One or more aspects of the method, apparatus, non-transitory computer readable medium, and system include identifying segmentation training data including an image depicting an element, a prompt identifying the element, and a mask indicating a first region of the image that includes the element; generating a partially noisy image map that includes noise in the first region and image features from the image in a second region outside the first region; generating a composite image map using a diffusion model based on the partially noisy image map and the prompt, wherein the composite image map depicts the element in the first region that corresponds to the mask; comparing the composite image map to the image; and training the diffusion model by updating parameters of the diffusion model based on the comparison.

An apparatus and system for multi-modal image editing are described. One or more aspects of the apparatus and system include one or more processors; one or more memory components coupled with the one or more processors; a pre-processing component configured to generate a partially noisy image map that includes noise in a first region that corresponds to a mask and image features from an image in a second region outside the first region; and a diffusion model configured to generate a composite image map based on the partially noisy image map and a prompt identifying an element to be added to the image, wherein the composite image map depicts the element in the first region that corresponds to the mask.

DETAILED DESCRIPTION

Figure 1:
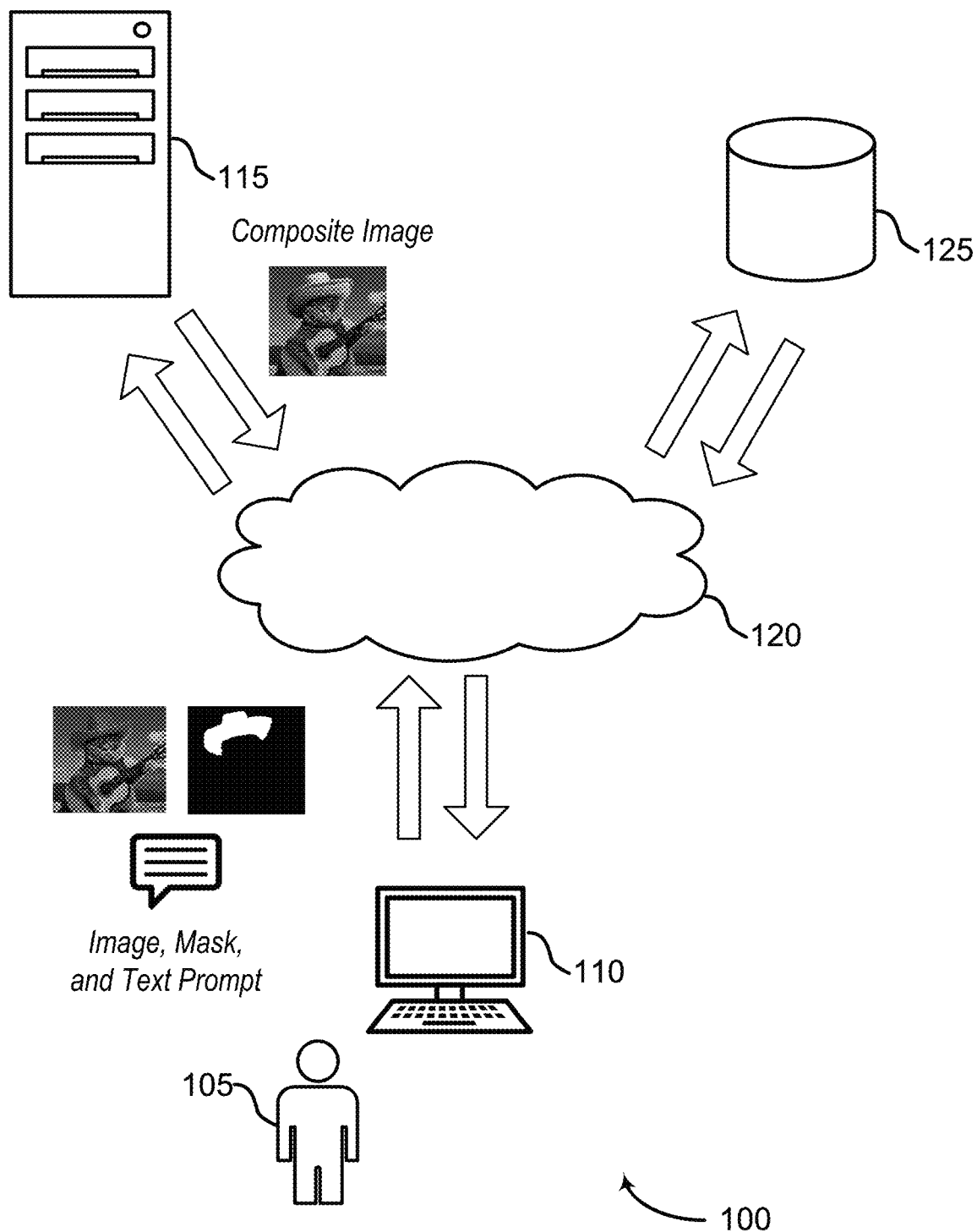
FIG. 1 shows an example of an image editing system according to aspects of the present disclosure.

Embodiments of the present disclosure relate generally to image editing, and more specifically to multi-modal image editing. Image editing can be accomplished by adding or removing information from an image. An example of an approach to image editing is image inpainting, in which information is removed from an image, the missing information is reconstructed, and the reconstructed information is combined with the remainder of the information in the image to form a new image. Images can be generated according to multiple modalities. For example, an image can be generated based on a text input, such that the content of the image is determined based on the text input.

Conventional image editing systems may use machine learning to perform image editing. For example, a generative adversarial network (GAN) may be used to invert an input image from a pixel space to a latent space of the GAN, and then image inpainting may be performed. However, the inversion adversely affects the quality of the inpainted image.

Another approach to image editing is a blended diffusion model (BDM). BDM incorporates a pretrained diffusion model and Contrastive Learning-Image Pre-training (CLIP). During each step of a BDM process, the pretrained diffusion model blends a noised image background with a generated foreground, using a CLIP score of a text input to guide the generation to be compatible with the input text. However, BDM heavily relies on CLIP to generate the foreground, and fails to utilize the rich background information, resulting in a generated image that does not realistically combine the background with the generated foreground. Furthermore, BDM does not support user control of the generated foreground apart from the input text, which may lead to a user repeatedly using the BDM process until an acceptable result (if any) is generated.

There is therefore a need in the art for multi-modal image editing systems and methods that can perform realistic and user-responsive image inpainting. According to an aspect of the present disclosure, a multi-modal image editing system receives an image, a mask, and a prompt (such as a text input) describing an object or background texture to be added to the image as input. The multi-modal image editing system performs image inpainting by replacing a region of the image corresponding to the mask with noise and using a diffusion model to denoise the noisy region based on the mask and the text prompt according to a prediction of what the object or background texture should look like when combined with the image. Because the diffusion model performs the denoising process based on the mask, the text prompt, and a partially noisy input, the multi-modal image editing system is able to output a new image that realistically inpaints the object or background texture to the image in an area delineated by the mask.

Additionally, according to an aspect of the present disclosure, a multi-modal image editing system provides a user interface for generating the mask based on an input mask. In an example, the user provides the input mask to the user interface, and provides an input to a slider tool of the user interface. In response to the user moving the slider tool, the user interface expands a boundary of the input mask to generate the mask. Because a shape, size, and quality of the object or background texture changes in outputs of the diffusion model based on boundaries of masks that are provided to the diffusion model, the user is therefore able to easily and intuitively control the output to generate satisfactory inpainted images.

Furthermore, according to an aspect of the present disclosure, a diffusion model is trained to perform the denoising process based on an input that only includes noise in a region corresponding to the mask. In some cases, the partially noisy input, the mask, and the prompt are incorporated as inputs in the denoising process, and the diffusion model is trained based on an output of the diffusion process. Therefore, instead of a conventional approach of randomly erasing parts of an image and training a diffusion model to recover the missing image information, a multi-modal image editing system teaches the diffusion model to effectively recover missing information from the image by using the missing information as input, thereby teaching the diffusion model to produce outputs that realistically incorporate the object or background texture with the remainder of the image.

An example of the present disclosure is used in an image editing context. In the example, a user wants to edit an image depicting a horse in a desert beneath a sky such that a generated image will depict the horse and a portion of the desert as a foreground and a waterfall as a background. The user provides the image, a mask for the image that includes a mask region (for example, a region corresponding to a region of the image depicting the horse and a portion of the desert) and a non-mask region (for example, a region corresponding to a region of the image depicting a remaining portion of the desert and the sky), and a text prompt "waterfall" to the multi-modal image editing system via a user interface provided on a user device by the multi-modal image editing system. Based on the image and the mask, the multi-modal image editing system obtains partially noisy image data that comprises noise in a first region corresponding to the mask region and does not comprise noise in a second region corresponding to the non-mask region.

The multi-modal image editing system denoises the first region of the partially noisy image data based on the prompt and the mask to output a composite image map (e.g., an image feature map representation of a composite image) that comprises a realistic combination of the horse, the desert, and a waterfall. The multi-modal image editing system then decodes the composite image map to provide a composite image depicting the realistic combination of the horse, the desert, and the waterfall to the user via the user interface.

In some cases, the user may not be satisfied with the composite image, or wishes to see other combinations of the horse, the desert, and a waterfall. Accordingly, the user provides a brush tool input to a brush tool of the user interface, thereby instructing the user interface to generate a new mask based on the user-provided mask. The multi-modal image editing system generates the new mask, and generates a second composite image depicting a different realistic combination of the horse, the desert, and a waterfall based on the new mask. The user can provide likewise provide multiple brush tool inputs to instruct the multi-modal image editing system to generate multiple composite images until a satisfactory combination of the horse, the desert, and a waterfall is generated.

According to some aspects, a multi-modal image editing system is provided. In some cases, the multi-modal image editing system includes a pre-processing component and a diffusion model.

In some cases, the pre-processing component is configured to identify an image, a prompt identifying an element to be added to the image, and a mask indicating a region of the image for depicting the element. In some cases, the pre-processing component is further configured to generate a partially noisy image map that includes noise in a first region that corresponds to the mask and image features from the image in a second region outside the first region (i.e., that does not correspond to the mask).

In some cases, the diffusion model is configured to generate a composite image map based on the partially noisy image map and the prompt, where the composite image map includes the element in the first region that corresponds to the mask. By generating the composite image map based on the partially noisy image map and the prompt, the multi-modal image editing system is able to create a depiction that realistically inpaints the element into the image.

As used herein, an "element" refers to an object or a background texture of an image. A "partially noisy image map" can refer to latent features in a latent space or image features in a pixel space that are representations of a first region including noise and a second region that does not include noise. A "composite image map" can refer to an image, latent features in a latent space, image features in a pixel space, or an image feature map (e.g., a representation of an image that can be interpreted by an artificial neural network).

Figure 2:
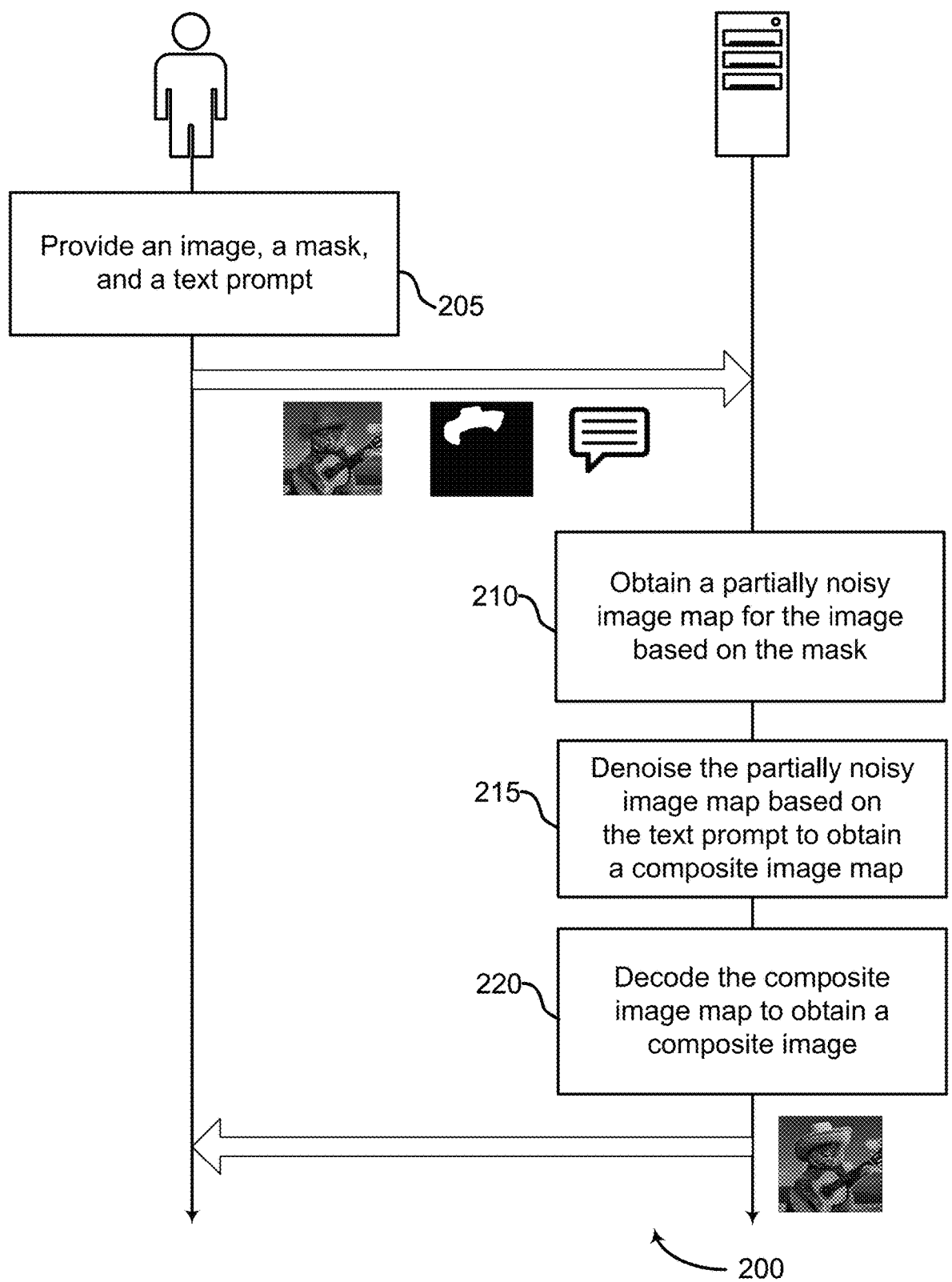
FIG. 2 shows an example of a method for multi-modal image editing according to aspects of the present disclosure.
Figure 3:
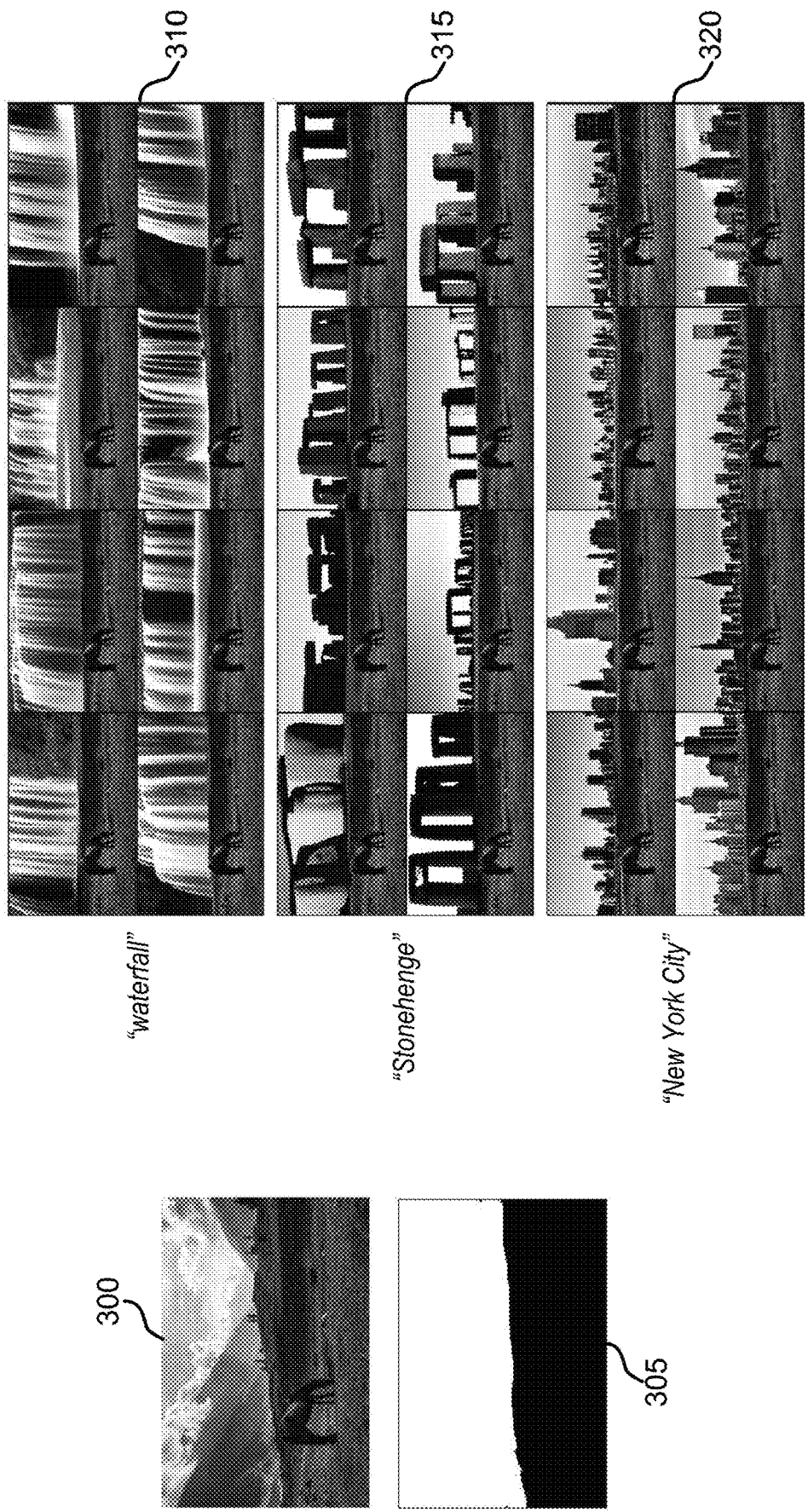
FIG. 3 shows an example of composite images according to aspects of the present disclosure.

Further example applications of the present disclosure in the image editing context are provided with reference to FIGS. 1-3. Details regarding the architecture of the multi-modal image editing system are provided with reference to FIGS. 1-7 and 14. Examples of a process for image editing are provided with reference to FIGS. 8-11. Examples of a process for training a machine learning model are provided with reference to FIGS. 12-13.

Accordingly, embodiments of the present disclosure enable users to specify a text prompt and a region of an image for inpainting the text prompt. As a result, users can edit or inpaint particular regions of an image while retaining other regions of an image. This improves the accuracy of the resulting images, and provides users with the desired output more consistently. Furthermore, users can have more control while editing images while retaining the ability of a diffusion model to generate different output variants.

Image Editing System

A system and an apparatus for multi-modal image editing is described with reference to FIGS. 1-7 and 14. One or more aspects of the system and the apparatus include one or more processors; one or more memory components coupled with the one or more processors; a pre-processing component configured to generate a partially noisy image map that includes noise in a first region that corresponds to a mask and image features from an image in a second region that does not correspond to the mask; and a diffusion model configured to generate a composite image map based on the partially noisy image map and a prompt identifying an element to be added to the image, wherein the composite image map depicts the element in the first region that corresponds to the mask.

Some examples of the system and the apparatus further include a user interface that includes a brush tool for generating the mask and a precision control element for obtaining a mask precision indicator. In some aspects, the diffusion model is further configured to generate image features based on the image, and decode the composite image map to obtain a composite image. In some aspects, the diffusion model comprises a U-Net architecture. In some aspects, the diffusion model comprises a channel corresponding to the mask. Some examples of the system and the apparatus further include a mask network configured generate a predicted mask based on the composite image map.

FIG. 1 shows an example of an image editing system 100 according to aspects of the present disclosure. The example shown includes user device 110, image editing apparatus 115, cloud 120, and database 125.

Referring to FIG. 1, user 105 provides an image, a text prompt, and a mask to image editing apparatus 115 via user device 110. The mask is an image comprising a mask region including pixels of the mask that correspond to pixels of the image that are to be altered by image editing apparatus 115, and a non-mask region comprising remaining pixels of the mask that correspond to pixels of the image that are not to be altered by image editing apparatus 115. In the example of FIG. 1, the image includes pixels depicting a cat wearing a hat and playing a guitar against a landscape background, and the mask includes a mask region corresponding to the pixels of the image that depict the hat.

Image editing apparatus 115 generates a composite image in response to the input and provides the composite image to user 105 via user device 110. The composite image includes pixels of the image that correspond to the non-mask region, and includes new pixels in an area of the image that correspond to the mask region. The content of the pixels of the composite image that correspond to the mask region is generated by image editing apparatus 115 based on the text prompt. In the example of FIG. 1, the text prompt can be "hat", "round-brimmed hat", "banded hat", "light-colored banded hat", etc. Accordingly, based on the text prompt and an area provided by the mask, image editing apparatus 115 generates the composite image to include the cat playing the guitar against the landscape background depicted in the image, and a hat that is different from the hat depicted in the image. Image editing apparatus 115 thereby performs multi-modal image editing by inpainting a user-provided region of an original image with content based on a user-provided text prompt to generate a new image that includes the content of the original image corresponding to the non-mask region and prompt-based content corresponding to the mask region.

According to some aspects, user device 110 is a personal computer, laptop computer, mainframe computer, palmtop computer, personal assistant, mobile device, or any other suitable processing apparatus. In some examples, user device 110 includes software that displays a graphical user interface provided by image editing apparatus 115. In some aspects, the graphical user interface allows user 105 to upload or otherwise transfer files including an image, a mask, a text prompt, or a combination thereof to image editing apparatus 115. In some aspects, the graphical user interface allows user 105 to control parameters of the mask in order to alter the appearance of the new content that is introduced in the composite image (e.g., the content that corresponds to the pixels of the mask). In some aspects, the image editing apparatus 115 provides the composite image to the user 105 via the graphical user interface.

According to some aspects, a user interface enables user 105 to interact with user device 110. In some embodiments, the user interface may include an audio device, such as an external speaker system, an external display device such as a display screen, or an input device (e.g., a remote-control device interfaced with the user interface directly or through an IO controller module). In some cases, the user interface may be a graphical user interface.

According to some aspects, image editing apparatus 115 includes a computer implemented network. In some embodiments, the computer implemented network includes a machine learning model (such as a diffusion model as described with reference to FIGS. 4, 5, and 7). In some embodiments, image editing apparatus 115 also includes one or more processors, a memory subsystem, a communication interface, an I/O interface, one or more user interface components, and a bus. Additionally, in some embodiments, image editing apparatus 115 communicates with user device 110 and database 125 via cloud 120.

In some cases, image editing apparatus 115 is implemented on a server. A server provides one or more functions to users linked by way of one or more of various networks, such as cloud 120. In some cases, the server includes a single microprocessor board, which includes a microprocessor responsible for controlling all aspects of the server. In some cases, the server uses microprocessor and protocols to exchange data with other devices or users on one or more of the networks via hypertext transfer protocol (HTTP), and simple mail transfer protocol (SMTP), although other protocols such as file transfer protocol (FTP), and simple network management protocol (SNMP) may also be used. In some cases, the server is configured to send and receive hypertext markup language (HTML) formatted files (e.g., for displaying web pages). In various embodiments, the server comprises a general-purpose computing device, a personal computer, a laptop computer, a mainframe computer, a supercomputer, or any other suitable processing apparatus.

Further detail regarding the architecture of image editing apparatus 115 is provided with reference to FIGS. 2-7 and 14. Further detail regarding a process for image editing is provided with reference to FIGS. 8-11. Further detail regarding a process for training a machine learning model of image editing system 100 is provided with reference to FIGS. 12-13.

Cloud 120 is a computer network configured to provide on-demand availability of computer system resources, such as data storage and computing power. In some examples, cloud 120 provides resources without active management by user 105. The term "cloud" is sometimes used to describe data centers available to many users over the Internet. Some large cloud networks have functions distributed over multiple locations from central servers. A server is designated an edge server if it has a direct or close connection to a user. In some cases, cloud 120 is limited to a single organization. In other examples, cloud 120 is available to many organizations. In one example, cloud 120 includes a multi-layer communications network comprising multiple edge routers and core routers. In another example, cloud 120 is based on a local collection of switches in a single physical location. According to some aspects, cloud 120 provides communications between user device 110, image editing apparatus 115, and database 125.

Database 125 is an organized collection of data. In an example, database 125 stores data in a specified format known as a schema. According to some aspects, database 125 is structured as a single database, a distributed database, multiple distributed databases, or an emergency backup database. In some cases, a database controller manages data storage and processing in database 125. In some cases, a user interacts with the database controller. In other cases, the database controller operates automatically without interaction from the user. According to some aspects, database 125 is external to image editing apparatus 115 and communicates with image editing apparatus 115 via cloud 120. According to some aspects, database 125 is included in image editing apparatus 115.

FIG. 2 shows an example of a method 200 for multi-modal image editing according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 2, a user provides an image, a text prompt, and a mask to an image editing apparatus. The mask is an image comprising a mask region including pixels of the mask that correspond to pixels of the image that are to be altered by the image editing apparatus, and a non-mask region comprising remaining pixels of the mask that correspond to pixels of the image that are not to be altered by the image editing apparatus. In the example of FIG. 2, the image includes pixels depicting a cat wearing a hat and playing a guitar against a landscape background, and the mask includes a mask region corresponding to the pixels of the image that depict the hat.

The image editing apparatus generates a composite image in response to the input and provides the composite image to the user. The composite image includes pixels of the image that correspond to the non-mask region, and includes new pixels in an area of the image that correspond to the mask. The content of the pixels of the composite image that correspond to the mask region is generated by the image editing apparatus based on the text prompt. In the example of FIG. 2, the text prompt can be "hat", "round-brimmed hat", "banded hat", "light-colored banded hat", etc. Accordingly, based on the text prompt and an area provided by the mask, the image editing apparatus generates the composite image to include the cat playing the guitar against the landscape background depicted in the image, and a hat that is different from the hat depicted in the image. The image editing apparatus thereby performs multi-modal image editing by inpainting a user-provided region of an original image with content based on a user-provided text prompt to generate a new image that includes the content of the original image corresponding to the non-mask region and prompt-based content corresponding to the mask region.

At operation 205, the system provides an image, a mask, and a text prompt. In some cases, the operations of this step refer to, or may be performed by, a user as described with reference to FIG. 1. For example, in some cases, the user provides the image, the mask, and the text prompt via a graphical user interface provided by an image editing apparatus as described with reference to FIGS. 1, 4, and 7 on a user device as described with reference to FIG. 1. In some cases, the image editing apparatus identifies the image, the mask, and the text prompt as described with reference to FIG. 8.

At operation 210, the system obtains a partially noisy image map for the image based on the mask. In some cases, the operations of this step refer to, or may be performed by, an image editing apparatus as described with reference to FIGS. 1, 4, and 7. For example, in some cases, the image editing apparatus obtains the partially noisy image map as described with reference to FIG. 8.

At operation 215, the system denoises the partially noisy image map based on the text prompt to obtain a composite image map. In some cases, the operations of this step refer to, or may be performed by, an image editing apparatus as described with reference to FIGS. 1, 4, and 7. For example, in some cases, the image editing apparatus obtains the composite image map as described with reference to FIG. 8.

At operation 220, the system decodes the composite image map to obtain a composite image. In some cases, the operations of this step refer to, or may be performed by, an image editing apparatus as described with reference to FIGS. 1, 4, and 7. For example, in some cases, the image editing apparatus obtains the composite image as described with reference to FIG. 8. In some cases, the image editing apparatus provides the composite image to the user via the graphical user interface of the user device.

FIG. 3 shows an example of composite images according to aspects of the present disclosure. The example shown includes image 300, mask 305, first composite images 310, second composite images 315, and third composite images 320.

Referring to FIG. 3, an image editing apparatus as described with reference to FIGS. 1, 4, and 7 receives image 300, mask 305, and various prompts as input and respectively outputs first composite images 310, second composite images 315, and third composite images 320 according to the various prompts. For example, based on image 300, mask 305, and a prompt "waterfall", the image editing apparatus generates first composite images 310 depicting a waterfall above a foreground of image 305, where the waterfall is in-painted in a region of first composite images 310 that corresponds to a mask region of mask 305, and the foreground of image 305 is retained in a region of first composite images 310 that corresponds to a non-mask region of mask 305. Likewise, second composite images 315 are generated based on a "Stonehenge" prompt, and third composite images 320 are generated based on a "New York City" prompt.

In some cases, one or more of first composite images 310, second composite images 315, and third composite images 320 is generated based on a brush tool input as described with reference to FIGS. 8 and 9.

Figure 4:
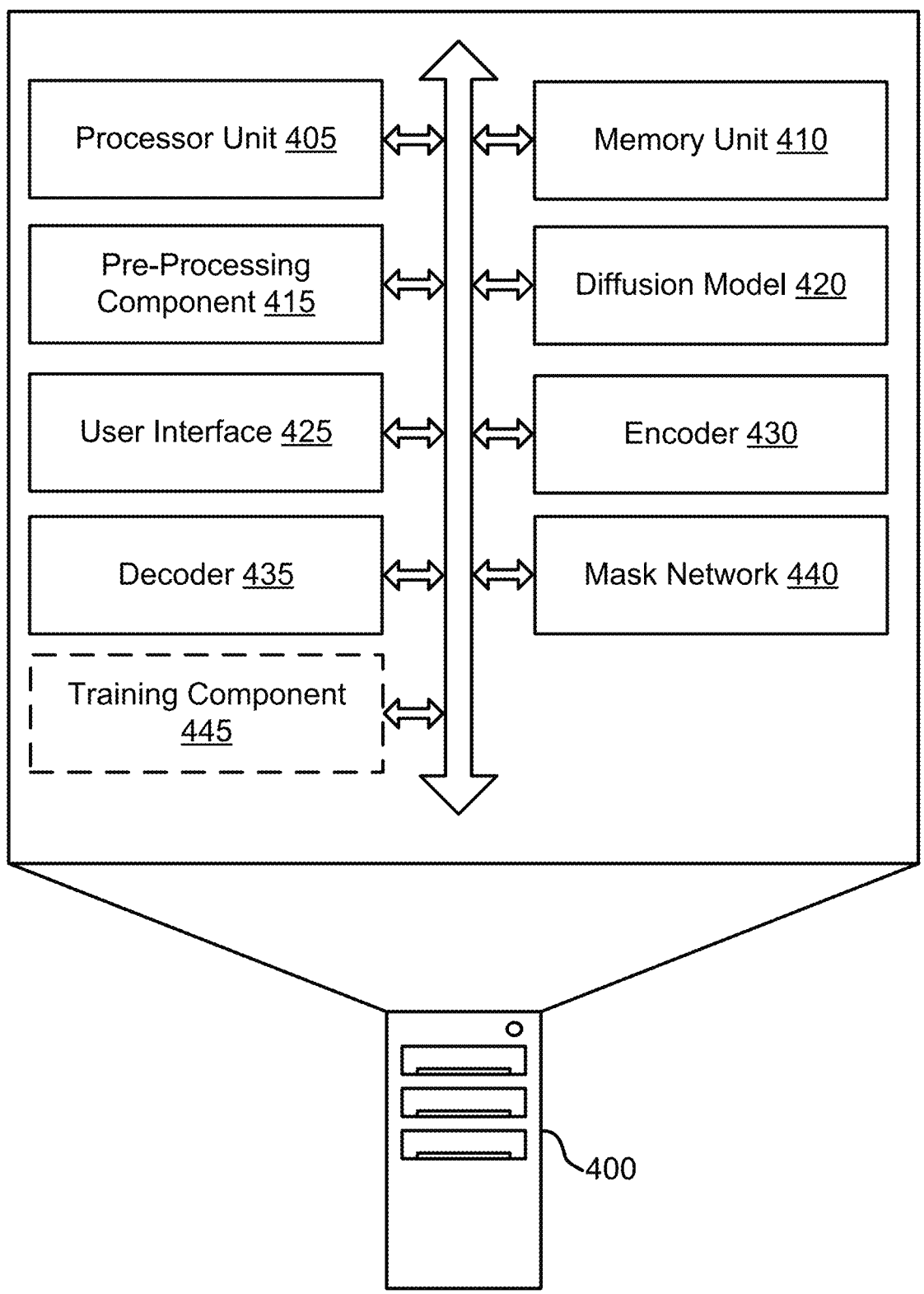
FIG. 4 shows an example of an image editing apparatus according to aspects of the present disclosure.

FIG. 4 shows an example of an image editing apparatus 400 according to aspects of the present disclosure. Image editing apparatus 400 is an example of, or includes aspects of, the corresponding element described with reference to FIGS. 1 and 6. Image editing apparatus 400 is an example of, or includes aspects of, the computing device described with reference to FIG. 14. For example, in some cases, pre-processing component 415, diffusion model 420, user interface 425, encoder 430, decoder 435, mask network 440, training component 445, or a combination thereof are implemented as hardware circuits that interact with components similar to the ones illustrated in FIG. 14 via a channel. For example, in some cases, pre-processing component 415, diffusion model 420, user interface 425, encoder 430, decoder 435, mask network 440, training component 445, or a combination thereof are implemented as software stored in a memory subsystem described with reference to FIG. 14.

In one aspect, image editing apparatus 400 includes processor unit 405, memory unit 410, pre-processing component 415, diffusion model 420, user interface 425, encoder 430, decoder 435, mask network 440, and training component 445.

Processor unit 405 includes one or more processors. A processor is an intelligent hardware device, such as a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof. In some cases, processor unit 405 is configured to operate a memory array using a memory controller. In other cases, a memory controller is integrated into processor unit 405. In some cases, processor unit 405 is configured to execute computer-readable instructions stored in memory unit 410 to perform various functions. In some aspects, processor unit 405 includes special purpose components for modem processing, baseband processing, digital signal processing, or transmission processing. According to some aspects, processor unit 405 comprises the one or more processors described with reference to FIG. 14.

Memory unit 410 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor of processor unit 405 to perform various functions described herein. In some cases, memory unit 410 includes a basic input/output system (BIOS) that controls basic hardware or software operations, such as an interaction with peripheral components or devices. In some cases, memory unit 410 includes a memory controller that operates memory cells of memory unit 410. For example, the memory controller may include a row decoder, column decoder, or both. In some cases, memory cells within memory unit 410 store information in the form of a logical state. According to some aspects, memory unit 410 comprises the memory subsystem described with reference to FIG. 14.

According to some aspects, pre-processing component 415 identifies an image, a prompt identifying an element to be added to the image, and a mask indicating a region of the image for depicting the element. In some examples, pre-processing component 415 generates a partially noisy image map that includes noise in a first region that corresponds to the mask and image features from the image in a second region that does not correspond to the mask.

In some examples, pre-processing component 415 combines the image and the composite image map based on the predicted mask. In some examples, pre-processing component 415 provides the mask as an input to the diffusion model 420.

According to some aspects, pre-processing component 415 is configured to generate a partially noisy image map that includes noise in a first region that corresponds to a mask and image features from an image in a second region that does not correspond to the mask. Pre-processing component 415 is an example of, or includes aspects of, the corresponding element described with reference to FIG. 7. According to some aspects, pre-processing component 415 is implemented as software stored in memory unit 410 and executable by processor unit 405, as firmware, as one or more hardware circuits, or as a combination thereof.

According to some aspects, diffusion model 420 generates a composite image map based on the partially noisy image map and the prompt, where the composite image map includes the element in the first region that corresponds to the mask. In some examples, diffusion model 420 generates intermediate denoising data using the diffusion model 420. In some examples, diffusion model 420 combines the intermediate denoising data with the partially noisy image map to obtain an intermediate composite image map.

According to some aspects, diffusion model 420 is configured to generate a composite image map based on the partially noisy image map and a prompt identifying an element to be added to the image, wherein the composite image map depicts the element in the first region that corresponds to the mask. In some aspects, the diffusion model is further configured to generate image features based on the image, and decode the composite image map to obtain a composite image.

According to some aspects, diffusion model 420 includes one or more artificial neural networks (ANNs). An ANN is a hardware or a software component that includes a number of connected nodes (i.e., artificial neurons) that loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. In some examples, nodes may determine their output using other mathematical algorithms, such as selecting the max from the inputs as the output, or any other suitable algorithm for activating the node. Each node and edge are associated with one or more node weights that determine how the signal is processed and transmitted.

In ANNs, a hidden (or intermediate) layer includes hidden nodes and is located between an input layer and an output layer. Hidden layers perform nonlinear transformations of inputs entered into the network. Each hidden layer is trained to produce a defined output that contributes to a joint output of the output layer of the neural network. Hidden representations are machine-readable data representations of an input that are learned from a neural network's hidden layers and are produced by the output layer. As the neural network's understanding of the input improves as it is trained, the hidden representation is progressively differentiated from earlier iterations.

During a training process of an ANN, the node weights are adjusted to improve the accuracy of the result (i.e., by minimizing a loss which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times. In some aspects, the diffusion model 420 includes a U-Net architecture. In some cases, the U-Net architecture is an example of, or includes aspects of, the U-Net architecture described with reference to FIG. 6. In some aspects, the diffusion model 420 includes a channel corresponding to the mask.

Diffusion model 420 is an example of, or includes aspects of, the corresponding element described with reference to FIG. 7. According to some aspects, diffusion model is an example of, or includes aspects of, the guided latent diffusion model described with reference to FIG. 5. According to some aspects, diffusion model 420 is implemented as software stored in memory unit 410 and executable by processor unit 405, as firmware, as one or more hardware circuits, or as a combination thereof.

According to some aspects, user interface 425 receives a preliminary mask and a mask precision indicator. In some examples, user interface 425 expands the preliminary mask based on the mask precision indicator to obtain the mask.

According to some aspects, user interface 425 includes a brush tool for generating the mask and a precision control element for obtaining a mask precision indicator. In some examples, user interface 425 receives a brush tool input from a user. In some examples, user interface 425 generates the preliminary mask based on the brush tool input. According to some aspects, diffusion model 420 is implemented as software stored in memory unit 410 and executable by processor unit 405.

According to some aspects, encoder 430 encodes the image to obtain an image feature map, where the partially noisy image map is based on the image feature map. According to some aspects, encoder 430 includes one or more ANNs. Encoder 430 is an example of, or includes aspects of, the corresponding element described with reference to FIG. 7. According to some aspects, encoder 430 is an example of, or includes aspects of, the image encoder described with reference to FIG. 5. According to some aspects, encoder 430 is implemented as software stored in memory unit 410 and executable by processor unit 405, as firmware, as one or more hardware circuits, or as a combination thereof.

According to some aspects, decoder 435 decodes the composite image map to obtain a composite image. According to some aspects, decoder 435 includes one or more ANNs. Decoder 435 is an example of, or includes aspects of, the corresponding element described with reference to FIG. 7. According to some aspects, decoder 435 is an example of, or includes aspects of, the image decoder described with reference to FIG. 5. According to some aspects, decoder 435 is implemented as software stored in memory unit 410 and executable by processor unit 405, as firmware, as one or more hardware circuits, or as a combination thereof.

According to some aspects, mask network 440 is configured to generate a predicted mask based on the composite image map. According to some aspects, mask network 440 includes one or more ANNs. According to some aspects, mask network 440 comprises a Mask-R-CNN.

A convolutional neural network (CNN) is a class of neural network that is commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During a training process, the filters may be modified so that they activate when they detect a particular feature within the input.

A standard CNN may not be suitable when the length of the output layer is variable, i.e., when the number of the objects of interest is not fixed. Selecting a large number of regions to analyze using conventional CNN techniques may result in computational inefficiencies. Thus, in an R-CNN approach, a finite number of proposed regions are selected and analyzed.

A Mask R-CNN is a deep ANN that incorporates concepts of the R-CNN. Given an image as input, the Mask R-CNN provides object bounding boxes, classes, and masks (i.e., sets of pixels corresponding to object shapes). A Mask R-CNN operates in two stages. First, it generates potential regions (i.e., bounding boxes) where an object might be found. Second, it identifies the class of the object, refines the bounding box and generates a pixel-level mask in pixel level of the object. These stages may be connected using a backbone structure such as a feature pyramid network (FPN).

According to some aspects, mask network 440 is implemented as software stored in memory unit 410 and executable by processor unit 405, as firmware, as one or more hardware circuits, or as a combination thereof.

According to some aspects, training component 445 identifies segmentation training data including an image depicting an element, a prompt identifying the element, and a mask indicating a region of the image that includes the element. In some examples, training component 445 generates a partially noisy image map that includes noise in a first region that corresponds to the mask and image features from the image in a second region that does not correspond to the mask. In some examples, training component 445 compares the composite image map to the image. In some examples, training component 445 trains diffusion model 420 by updating parameters of diffusion model 420 based on the comparison. In some examples, training component 445 generates the mask and the prompt identifying the element based on segmentation data for the image.

In some examples, training component 445 computes a reconstruction loss based on the composite image map and the image, where the parameters of diffusion model 420 are updated based on the reconstruction loss. In some aspects, the reconstruction loss is only applied to the first region that corresponds to the mask.

In some examples, training component 445 identifies a pretrained diffusion model. In some examples, training component 445 fine-tunes the pretrained diffusion model based on the segmentation training data and on caption training data to obtain diffusion model 420. In some examples, training component 445 adds a channel to the pretrained diffusion model corresponding to the mask, where diffusion model 420 is fine-tuned based on the added channel.

According to some aspects, training component 445 comprises one or more ANNs. In some examples, training component 445 includes a Mask-R-CNN. According to some aspects, training component 445 is implemented as software stored in memory unit 410 and executable by processor unit 405, as firmware, as one or more hardware circuits, or as a combination thereof. According to some aspects, training component 445 is omitted from image editing apparatus 400 and is included in a separate computing device. In some cases, image editing apparatus 400 communicates with training component 445 in the separate computing device to train diffusion model 420 as described herein. According to some aspects, training component 445 is implemented as software stored in memory and executable by a processor of the separate computing device, as firmware in the separate computing device, as one or more hardware circuits of the separate computing device, or as a combination thereof.

According to some aspects, image editing apparatus 400 includes an untrained diffusion model as described with reference to FIGS. 12 and 13.

Figure 5:
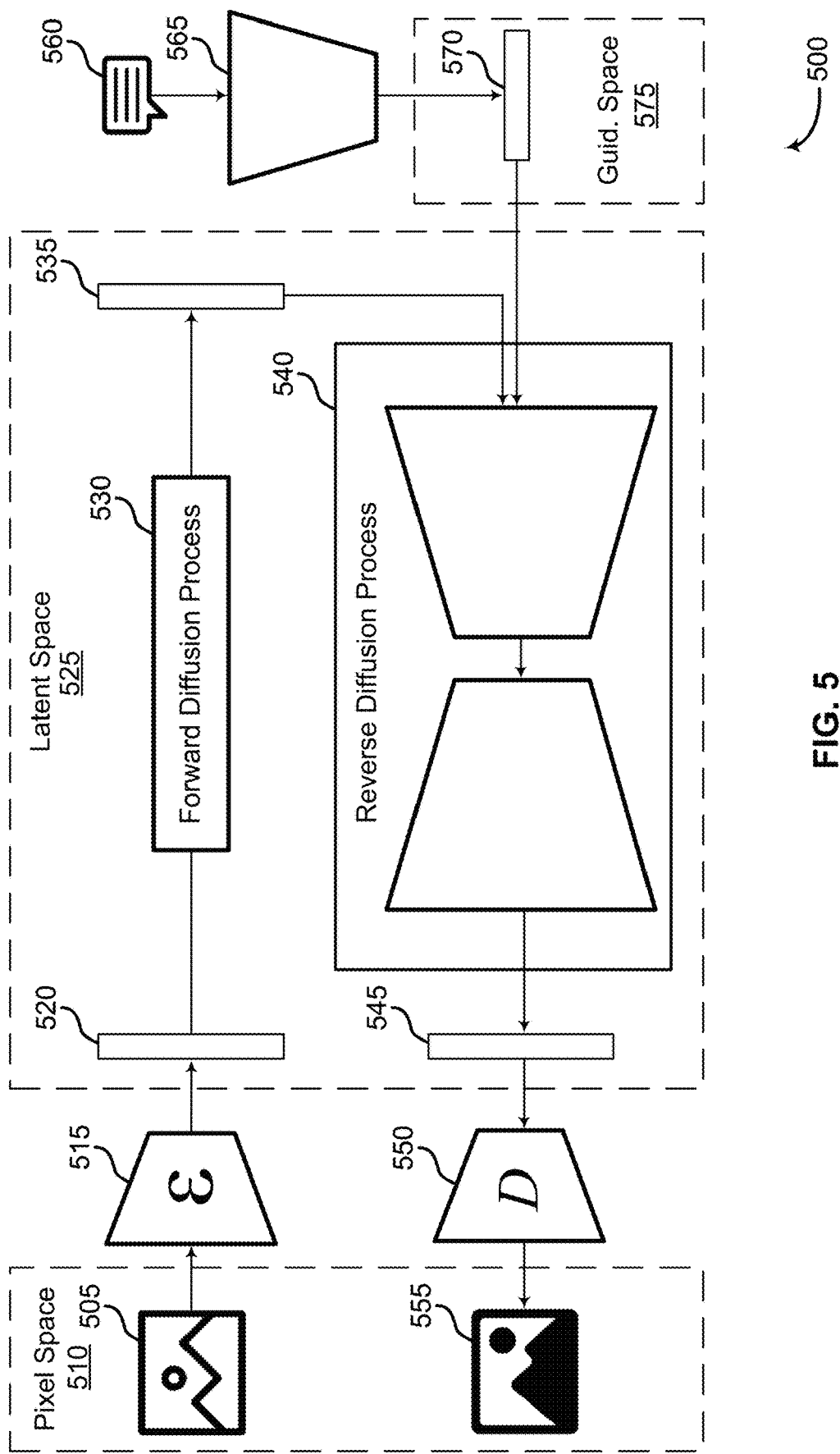
FIG. 5 shows an example of a guided latent diffusion architecture according to aspects of the present disclosure.

FIG. 5 shows an example of a guided latent diffusion architecture 500 according to aspects of the present disclosure.

Diffusion models are a class of generative ANNs that can be trained to generate new data with features similar to features found in training data. In particular, diffusion models can be used to generate novel images. Diffusion models can be used for various image generation tasks, including image super-resolution, generation of images with perceptual metrics, conditional generation (e.g., generation based on text guidance), image inpainting, and image manipulation.

Diffusion models function by iteratively adding noise to data during a forward diffusion process and then learning to recover the data by denoising the data during a reverse diffusion process. Examples of diffusion models include Denoising Diffusion Probabilistic Models (DDPMs) and Denoising Diffusion Implicit Models (DDIMs). In DDPMs, a generative process includes reversing a stochastic Markov diffusion process. On the other hand, DDIMs use a deterministic process so that a same input results in a same output. Diffusion models may also be characterized by whether noise is added to an image itself, or to image features generated by an encoder, as in latent diffusion.

For example, according to some aspects, image encoder 505 encodes original image 505 from pixel space 510 as original image features 520 in latent space 525. Original image 505 is an example of, or includes aspects of, the image described with reference to FIGS. 3 and 7. Image encoder 505 is an example of, or includes aspects of, the encoder described with reference to FIGS. 4 and 7. In some cases, original image features 520 are examples of, or include aspects of, the image feature map described with reference to FIG. 7.

According to some aspects, forward diffusion process 530 gradually adds noise to original image features 520 to obtain noisy features 535 (also in latent space 525) at various noise levels. In some cases, forward diffusion process 530 is implemented as the forward diffusion process described with reference to FIG. 8, 10, 12, or 13. In some cases, forward diffusion process 530 is implemented by a pre-processing component described with reference to FIGS. 4 and 7. In some cases, forward diffusion process 530 is implemented by a training component described with reference to FIG. 4. In some cases, noisy features 535 are examples of, or include aspects of the partially noisy image map described with reference to FIG. 7.

According to some aspects, reverse diffusion process 540 is applied to noisy features 535 to gradually remove the noise from noisy features 535 at the various noise levels to obtain denoised image features 545 in latent space 525. In some cases, reverse diffusion process 540 is implemented as the reverse diffusion process described with reference to FIG. 8, 10, 12, or 13. In some cases, reverse diffusion process 540 is implemented by a diffusion model described with reference to FIGS. 4 and 7.

In some cases, the diffusion model is a latent diffusion model. In some cases, reverse diffusion process 540 is implemented by a U-Net ANN described with reference to FIGS. 4 and 6 included in the diffusion model. In some cases, denoised image features 545 are examples of, or include aspects of, the composite image map described with reference to FIG. 7.

According to some aspects, a training component (such as the training component described with reference to FIG. 4) compares denoised image features 545 to original image features 520 at each of the various noise levels, and updates parameters of the diffusion model based on the comparison. In some cases, image decoder 550 decodes denoised image features 545 to obtain output image 555 in pixel space 510. In some cases, an output image 555 is created at each of the various noise levels. In some cases, the training component compares output image 555 to original image 505 to train the diffusion model. Image decoder 550 is an example of, or includes aspects of, the decoder described with reference to FIGS. 4 and 7. In some cases, output image 555 is an example of, or includes aspects of, a composite image as described with reference to FIGS. 3 and 7.

In some cases, image encoder 515 and image decoder 550 are pretrained prior to training the diffusion model. In some examples, image encoder 515, image decoder 550, and the diffusion model are jointly trained. In some cases, image encoder 515 and image decoder 550 are jointly fine-tuned with the diffusion model.

According to some aspects, reverse diffusion process 540 is also guided based on a guidance prompt such as text prompt 560 (e.g., a prompt described with reference to FIGS. 3 and 7), an image (e.g., a mask described with reference to FIGS. 3 and 7), a layout, a segmentation map, etc. In some cases, text prompt 560 is encoded using text encoder 565 (e.g., a multimodal encoder) to obtain guidance features 570 in guidance space 575. In some cases, guidance features 570 are combined with noisy features 535 at one or more layers of reverse diffusion process 540 to ensure that output image 555 includes content described by text prompt 560. For example, guidance features 570 can be combined with noisy features 535 using a cross-attention block within reverse diffusion process 540.

In the machine learning field, an attention mechanism is a method of placing differing levels of importance on different elements of an input. Calculating attention may involve three basic steps. First, a similarity between query and key vectors obtained from the input is computed to generate attention weights. Similarity functions used for this process can include dot product, splice, detector, and the like. Next, a softmax function is used to normalize the attention weights. Finally, the attention weights are weighed together with their corresponding values.

Figure 6:
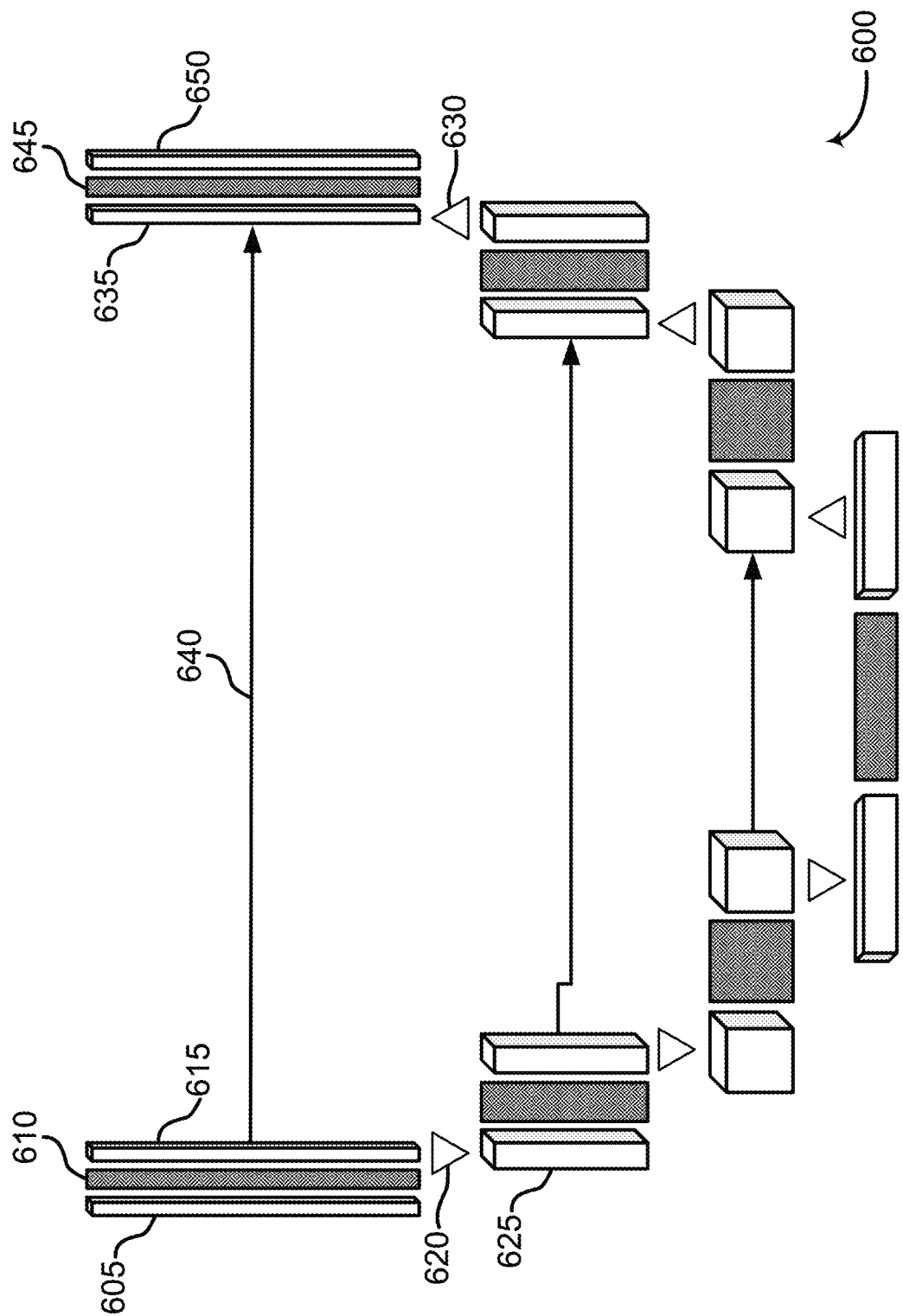
FIG. 6 shows an example of a U-Net according to aspects of the present disclosure.

FIG. 6 shows an example of a U-Net 600 according to aspects of the present disclosure. According to some aspects, a diffusion model (such as the diffusion model described with reference to FIGS. 4, 5, and 7) is based on an ANN architecture known as a U-Net. According to some aspects, U-Net 600 receives input features 605, where input features 605 include an initial resolution and an initial number of channels, and processes input features 605 using an initial neural network layer 610 (e.g., a convolutional network layer) to produce intermediate features 615.

In some cases, intermediate features 615 are then downsampled using a down-sampling layer 620 such that down-sampled features 625 have a resolution less than the initial resolution and a number of channels greater than the initial number of channels.

In some cases, this process is repeated multiple times, and then the process is reversed. That is, down-sampled features 625 are up-sampled using up-sampling process 630 to obtain up-sampled features 635. In some cases, up-sampled features 635 are combined with intermediate features 615 having a same resolution and number of channels via skip connection 640. In some cases, the combination of intermediate features 615 and up-sampled features 635 are processed using final neural network layer 645 to produce output features 650. In some cases, output features 650 have the same resolution as the initial resolution and the same number of channels as the initial number of channels.

According to some aspects, U-Net 600 receives additional input features to produce a conditionally generated output. In some cases, the additional input features include a vector representation of an input prompt. In some cases, the additional input features are combined with intermediate features 615 within U-Net 600 at one or more layers. For example, in some cases, a cross-attention module is used to combine the additional input features and intermediate features 615.

U-Net 600 is an example of, or includes aspects of, a U-Net included in the diffusion model described with reference to FIGS. 4, 5, and 7. In some cases, U-Net 600 implements the reverse diffusion process as described with reference to FIG. 5, 8, 10, 12, or 13.

Figure 7:
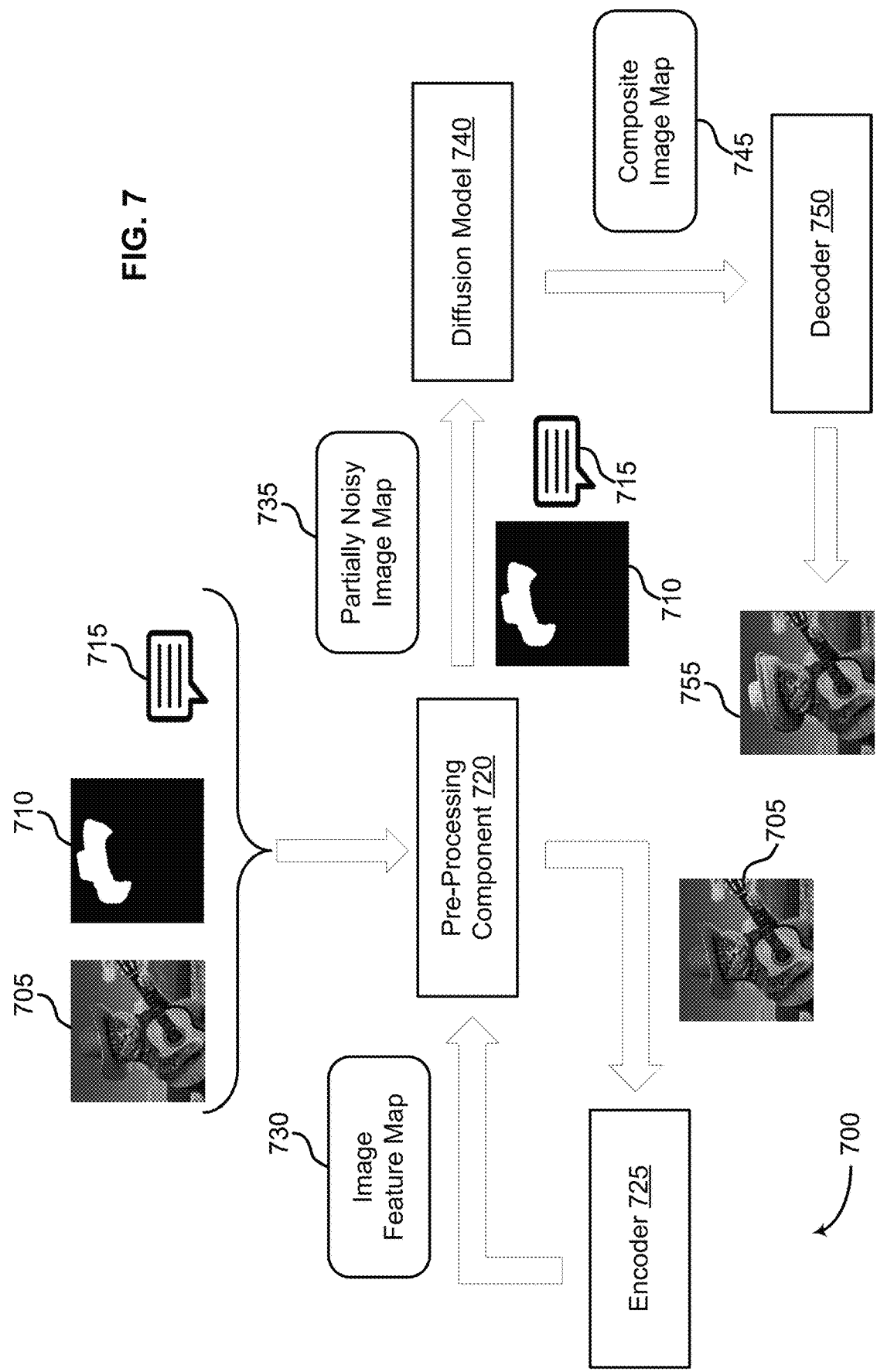
FIG. 7 shows an example of data flow in an image editing apparatus according to aspects of the present disclosure.

FIG. 7 shows an example of data flow in an image editing apparatus 700 according to aspects of the present disclosure. Image editing apparatus 700 is an example of, or includes aspects of, the corresponding element described with reference to FIGS. 1 and 4.

In one aspect, image editing apparatus 700 includes pre-processing component 720, encoder 725, diffusion model 740, and decoder 750. Pre-processing component 720 is an example of, or includes aspects of, the corresponding element described with reference to FIG. 4. Encoder 725 is an example of, or includes aspects of, the corresponding element described with reference to FIG. 4 and the image encoder described with reference to FIG. 5. Decoder 750 is an example of, or includes aspects of, the corresponding element described with reference to FIG. 4 and the image decoder described with reference to FIG. 5.

Referring to FIG. 7, pre-processing component 720 receives image 705, mask 710, and prompt 715 as input from a user. Pre-processing component provides image 705 as input to encoder 725, and encoder 725 outputs image feature map 730 to pre-processing component 720 in response.

Pre-processing component 720 adds noise to image feature map 730 based on mask 710 to generate partially noisy image map 735, and provides partially noise image map 735, mask 710, and prompt 715 to diffusion model 740 as input. In some cases, diffusion model also receives a mask type of mask 710 as input. Diffusion model 740 outputs composite image map 745 to decoder 750 based on the input. Decoder 750 decodes composite image map 745 to output composite image 755 to the user.

Image 705 is an example of, or includes aspects of, the corresponding element described with reference to FIG. 3 and the original image described with reference to FIG. 5. Mask 710 is an example of, or includes aspects of, the corresponding element described with reference to FIG. 3. Prompt 715 is an example of, or includes aspects of, the corresponding element described with reference to FIG. 5. In some cases, partially noisy image map 735 is an example of, or includes aspects of, the noisy features described with reference to FIG. 5. In some cases, composite image map 745 is an example of, or includes aspects of, the denoised features described with reference to FIG. 5. Composite image 755 is an example of, or includes aspects of, a composite image described with reference to FIG. 3 and the output image described with reference to FIG. 5.

Multi-Modal Image Editing

A method for multi-modal image editing is described with reference to FIGS. 8-11. One or more aspects of the method include identifying an image, a prompt identifying an element to be added to the image, and a mask indicating a region of the image for depicting the element; generating a partially noisy image map that includes noise in a first region that corresponds to the mask and image features from the image in a second region that does not correspond to the mask; and generating a composite image map using a diffusion model based on the partially noisy image map and the prompt, wherein the composite image map includes the element in the first region that corresponds to the mask.

Some examples of the method further include receiving a preliminary mask and a mask precision indicator. Some examples further include expanding the preliminary mask based on the mask precision indicator to obtain the mask. Some examples of the method further include receiving a brush tool input from a user. Some examples further include generating the preliminary mask based on the brush tool input.

Some examples of the method further include encoding the image to obtain an image feature map, wherein the partially noisy image map is based on the image feature map. Some examples further include decoding the composite image map to obtain a composite image.

Some examples of the method further include generating a predicted mask for the element based on the composite image map. Some examples further include combining the image and the composite image map based on the predicted mask. Some examples of the method further include providing the mask as an input to the diffusion model.

Some examples of the method further include generating intermediate denoising data using the diffusion model. Some examples further include combining the intermediate denoising data with the partially noisy image map to obtain an intermediate composite image map.

Figure 8:
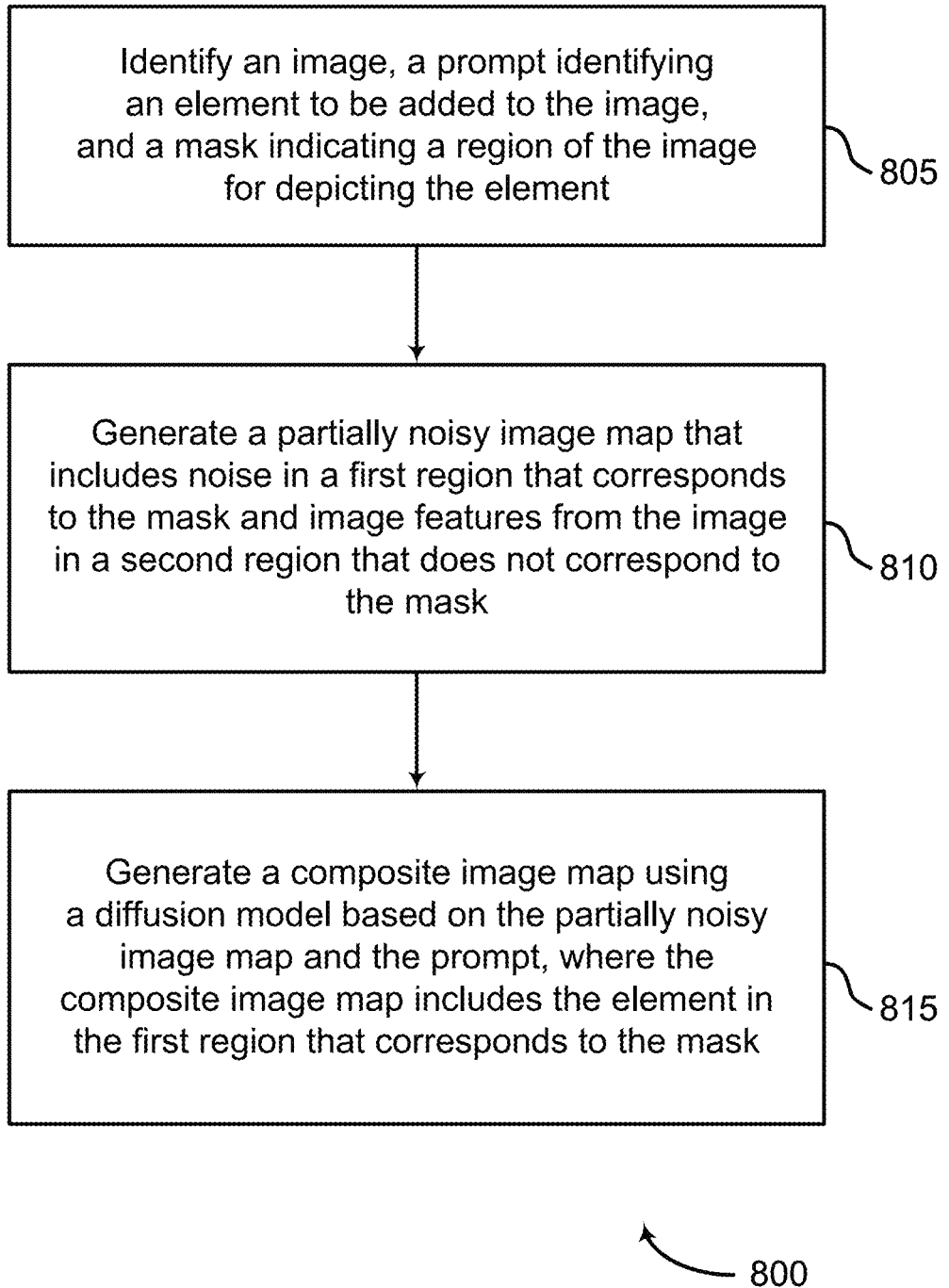
FIG. 8 shows an example of a method for generating a composite image map according to aspects of the present disclosure.

FIG. 8 shows an example of a method 800 for generating a composite image map according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 8, the system uses a diffusion model to generate a composite image map including an element described by a prompt based on an initial input of an image, the prompt, and a mask for the image. In some cases, the composite image map is determined based on a partially noisy image map, in which noise is added to a region corresponding to a mask region of the mask and is not added to a region corresponding to a non-mask region of the mask. Accordingly, by selectively adding noise to a region of an input for the diffusion model, the system is able to generate the composite image map by removing noise from the partially noisy image map such that the composite image map comprises the element realistically inpainted in a region of the image.

At operation 805, the system identifies an image, a prompt identifying an element to be added to the image, and a mask indicating a region of the image for depicting the element. In some cases, the operations of this step refer to, or may be performed by, a pre-processing component as described with reference to FIGS. 3 and 6.

For example, in some cases, a user as described with reference to FIG. 1 provides the image, the prompt, and the mask to the pre-processing component via a user interface (such as a graphical user interface) provided by an image editing apparatus as described with reference to FIGS. 1, 3, and 6 on a user device as described with reference to FIG. 1. In some cases, the user provides the image, the prompt, and the mask by uploading one or more files including the image, the prompt, and the mask to the pre-processing component via the user interface, or otherwise identifying the image, the prompt, and the mask to the user interface. For example, in some cases, the user can drag the image and/or the mask into an appropriate area of the user interface. In some cases, the user enters the prompt as text into the user interface.

In some cases, the prompt is a text prompt including text that identifies the element to be added to the image. In some cases, the element comprises an object. In some cases, the element comprises a background texture. In some cases, the text prompt can be simple (e.g., "hat" or "desert") or complex (e.g., "a broad-brimmed straw hat with a band and a feather" or "a brown-sand desert and a sky with white clouds"). In some cases, the user provides an audio file to the pre-processing component via the graphical user interface, and the pre-processing component converts the audio to text to obtain the prompt. In some cases, the prompt is a second image.

In some cases, the mask is an image or image features comprising a mask region including pixels of the mask that correspond to pixels of the image that are intended to depict the element, and a non-mask region comprising remaining pixels of the mask that correspond to pixels of the image that are not intended to depict the element.

In some cases, the user provides a preliminary mask and a mask precision indicator to the user interface. In some cases, the preliminary mask is a mask as described herein. In some cases, the user can use the user interface to select a mask precision indicator that corresponds to first through $n^{th}$ mask types, where each mask type of the first through $n^{th}$ mask types corresponds to a respectively increasing amount of Gaussian blur to be added to a mask region of the preliminary mask.

For example, in some cases, a first mask type corresponds to little or no added Gaussian blur, while an $n^{th}$ mask type corresponds to an amount of added Gaussian blur that would cause the mask region of the preliminary mask to be approximately equal to a bounding box of the mask region of the preliminary mask. According to some aspects, the user selects the mask precision indicator via a brush tool input provided to a brush tool of the user interface. In some cases, the user interface provides the mask type corresponding to the mask precision indicator to the pre-processing component.

In some cases, in response to receiving the mask precision indicator, the user interface blurs the mask region of the preliminary mask using a Gaussian function (e.g., convolving the preliminary mask with a Gaussian function) according to thresholds and sigma dictated by the mask type associated with the mask precision indicator to obtain the mask.

For example, in some cases, the user interface blurs the mask region of the preliminary mask to expand boundaries of the mask region to obtain the mask, where the mask includes the expanded mask region of the preliminary mask. By instructing the user interface to generate various masks having different-bounded mask regions based on the mask precision indicator, the user can therefore instruct the image editing apparatus to generate various composite image maps and/or composite images based on a same text prompt. The preliminary mask and the mask precision indicator are described in further detail with reference to FIG. 9.

At operation 810, the system generates a partially noisy image map that includes noise in a first region that corresponds to the mask and image features from the image in a second region that does not correspond to the mask. In some cases, the operations of this step refer to, or may be performed by, a pre-processing component as described with reference to FIGS. 3 and 6.

According to some aspects, the pre-processing component provides the image to an encoder as described with reference to FIGS. 3 and 6. In some cases, the encoder encodes the image to obtain an image feature map and provides the image feature map to the pre-processing component. In some cases, as a size of the image feature map in a latent space can be significantly smaller than a resolution of the image in a pixel space (e.g., 32, 64, etc. versus 256, 512, etc.), encoding the image to obtain the image feature map can reduce inference time by a large amount.

According to some aspects, the pre-processing component uses a forward diffusion process (such as the forward diffusion process $q(x_t|x_{t-1})$ described with reference to FIG. 10) to iteratively add Gaussian noise to an initial input $x_0$ at each diffusion step t according to a known variance schedule $0<\beta_1<\beta_2<\ldots<\beta_T<1$:

$$\hat{x} = \sqrt{\overline{\alpha}_t}x_0 + \sqrt{1-\overline{\alpha}_t}\epsilon \quad (1)$$

According to some aspects, the initial input $x_0$ is the image. According to some aspects, the initial input $x_0$ is the image feature map. According to some aspects, $\hat{x}$ denotes noising data. According to some aspects, the Gaussian noise is drawn from a Gaussian distribution with mean $\mu_t = \sqrt{1-\beta_t}x_{t-1}$ and variance $\sigma^2 = \beta_t \geq 1$ by sampling $\epsilon \sim \mathcal{N}(0,I)$ and setting $x_t = \sqrt{1-\beta_t}x_{t-1} + \sqrt{\beta_t}\epsilon$. According to some aspects, $\bar{\alpha}_t = \Pi_{s=1}^{t}\alpha_s$, where $\alpha_t := 1-\beta_t$.

According to some aspects, the pre-processing component generates partially noisy image data $\tilde{x}$ that includes noise in a first region that corresponds to the mask and image features from the image in a second region that does not correspond to the mask:

$$\tilde{x} = m \odot \hat{x} + (1-m) \odot x_0 \qquad (2)$$

According to some aspects, m is the mask. According to some aspects, the partially noisy image data is iteratively generated at each diffusion step t. According to some aspects, the partially noisy image data $\tilde{x}$ comprises latent features in a latent space. According to some aspects, the partially noisy image data $\tilde{x}$ comprises image features in a pixel space. In some cases, by combining the mask and the noising data $\hat{x}$ and also combining the mask with the initial input $x_0$ to obtain the partially noisy image data $\tilde{x}$, the pre-processing component only adds noise to the first region and does not add noise to the second region (e.g., a region that corresponds to the non-mask region), thereby encouraging a diffusion model as described with reference to FIGS. 4, 5, and 7 to use information from the image in a denoising process.

At operation 815, the system generates a composite image map using a diffusion model based on the partially noisy image map and the prompt, where the composite image map includes the element in the first region that corresponds to the mask. In some cases, the operations of this step refer to, or may be performed by, a diffusion model as described with reference to FIGS. 3 and 6.

According to some aspects, the diffusion model obtains the composite image map using a reverse diffusion process (e.g., a denoising process) such as the reverse diffusion process described with reference to FIG. 10. For example, in some cases, the diffusion model iteratively removes noise from the partially noisy image map to predict a composite image map comprising the element in the first region that corresponds to the mask and image features from the image in a second region that does not correspond to the mask. In some cases, at each diffusion step t, the diffusion model generates intermediate denoising data and combines the intermediate denoising data with the partially noisy image map to predict an intermediate composite image map. In some cases, the composite image map is the last iteration of the intermediate composite image map.

In some cases, the denoising data comprises a prediction of what the first region should look like when noise is removed from the region. In some cases, the denoising data is generated based on the prompt. For example, in some cases, the diffusion model comprises a text encoder that encodes the prompt as a guidance vector. In some cases, the denoising data is generated based on the mask. In some cases, the denoising data is generated based on the mask level.

In some cases, the composite image map comprises an image. In some cases, the composite image map comprises image features in a pixel space. In some cases, the composite image map comprises latent features in a latent space. In some cases, the composite image map comprises an image feature map. In some cases, the diffusion model outputs the composite image map to the user via the user interface.

According to some aspects, a mask generation network as described with reference to FIG. 4 performs post-processing by generating a predicted mask for the element based on the composite image map and combining the image and the composite image map based on the predicted mask. For example, in some cases, the mask generation network receives the composite image map from the diffusion model and receives the image from the pre-processing component. In some cases, the mask generation network uses an ANN (such as a Mask-R-CNN) comprised in the mask generation network to identify the element and predict a mask for the element. In some cases, the mask generation network combines the image and the composite image map based on the predicted mask to fine-tune the composite image map.

According to some aspects, the diffusion model provides the composite image map to a decoder as described with reference to FIGS. 3 and 6. In some cases, the decoder decodes the composite image map to obtain a composite image. In some cases, the composite image comprises the element in a first region that corresponds to the mask region of the mask and image features from the image in a second region that corresponds to the non-mask region of the mask. In some cases, the decoder outputs the composite image to the user via the user interface.

Figure 9:
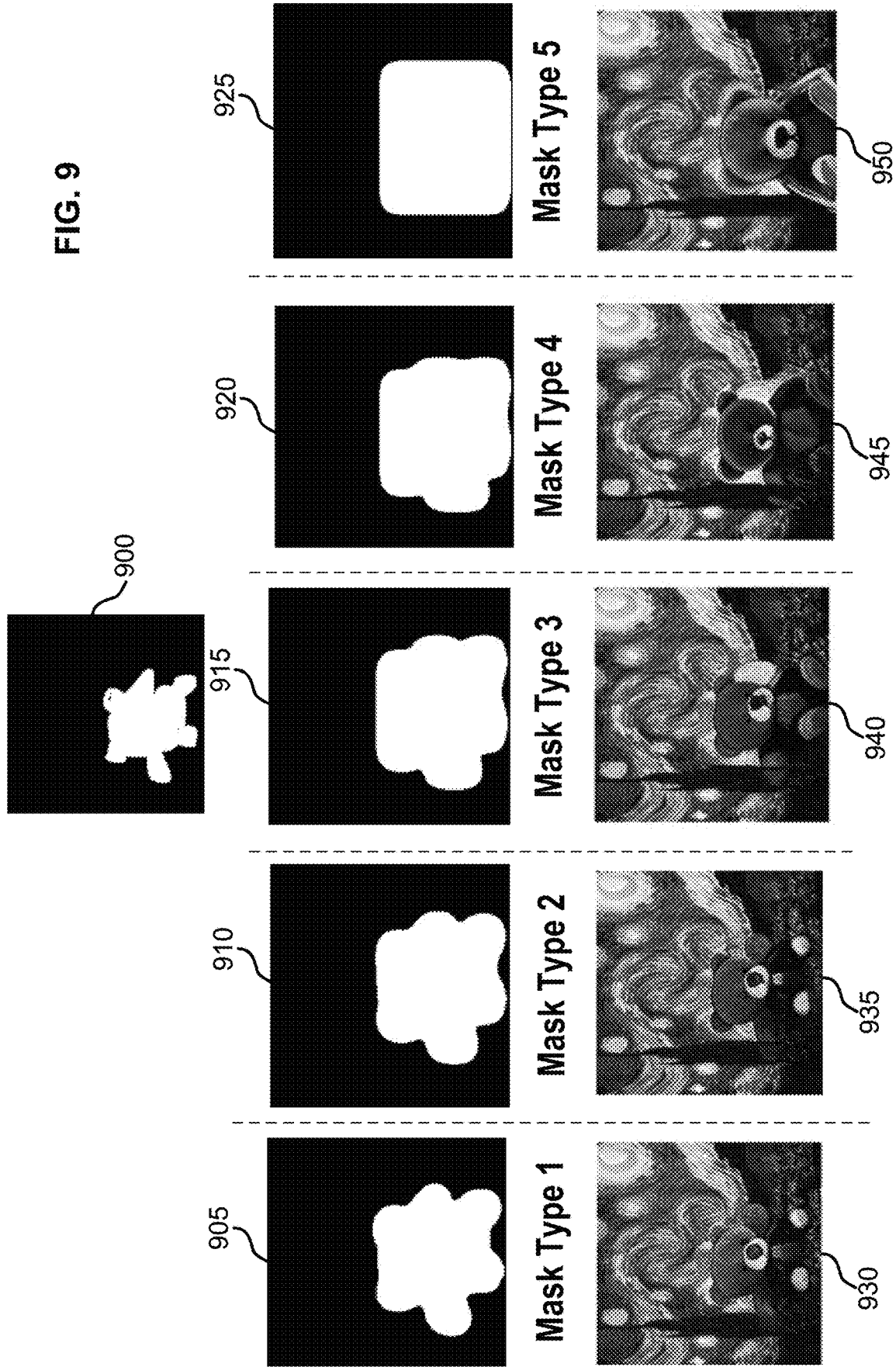
FIG. 9 shows an example of user-controlled mask generation according to aspects of the present disclosure.

FIG. 9 shows an example of user-controlled mask generation according to aspects of the present disclosure. The example shown includes preliminary mask 900, first mask 905, second mask 910, third mask 915, fourth mask 920, fifth mask 925, first composite image 930, second composite image 935, third composite image 940, fourth composite image 945, and fifth composite image 950. Each of first composite image 930, second composite image 935, third composite image 940, fourth composite image 945, and fifth composite image 950 are examples of, or include aspects of, the corresponding element described with reference to FIG. 7, a composite image described with reference to FIG. 3, and the output image described with reference to FIG. 5.

Referring to FIG. 9, a user provides preliminary mask 900 to a user interface as described with reference to FIG. 4. Preliminary mask 900 comprises a mask region corresponding to a boundary of an element to be added to an image (in this case, a teddy bear object) and a non-mask region corresponding to a region of an original image that is not to depict the element. In this case, the original image is a painting.

The user can choose between multiple mask types (e.g., first through fifth mask types) via a brush tool input provided to the user interface to provide a mask precision indicator as described with reference to FIG. 8. The user interface generates a mask based on preliminary mask 900 and the mask precision indicator using Gaussian blurring. As shown in FIG. 9, first mask 905 comprises a mask region with slightly greater boundaries than the mask region of preliminary mask 900, second through fourth masks 910 through 920 comprise mask regions having successively larger boundaries, and fifth mask 925 comprises a mask region that is approximately equal to a bounding box of the mask region of preliminary mask 900.

By instructing the user interface to generate various masks having different-bounded mask regions based on the mask precision indicator, the user can therefore instruct the image editing apparatus described with reference to FIGS. 1, 4, and 7 to generate various composite image maps and/or composite images based on a same text prompt. For example, referring to FIG. 9, the user provides an image depicting the painting, a text prompt "teddy bear in oil painting style", and preliminary mask 900 to the user interface. The user then instructs the user interface to generate first through fifth masks 905 through 925 via the mask precision indicator. The image editing apparatus then generates first through fifth composite images 930 through 950 respectively according to the image, the text prompt, and first through fifth masks 905 through 925 as described with reference to FIG. 8.

Each of first through fifth composite images 930 through 950 depicts the painting as a background, and depicts an inpainted teddy bear in an oil painting style as an object superimposed on the background. However, each of first through fifth composite images 930 through 950 also depict teddy bears of varying sizes, shapes, and qualities respectively based on their corresponding masks. Accordingly, the mask precision indicator provides the user with an ability to quickly generate a variety of composite images via the brush tool.

Figure 10:
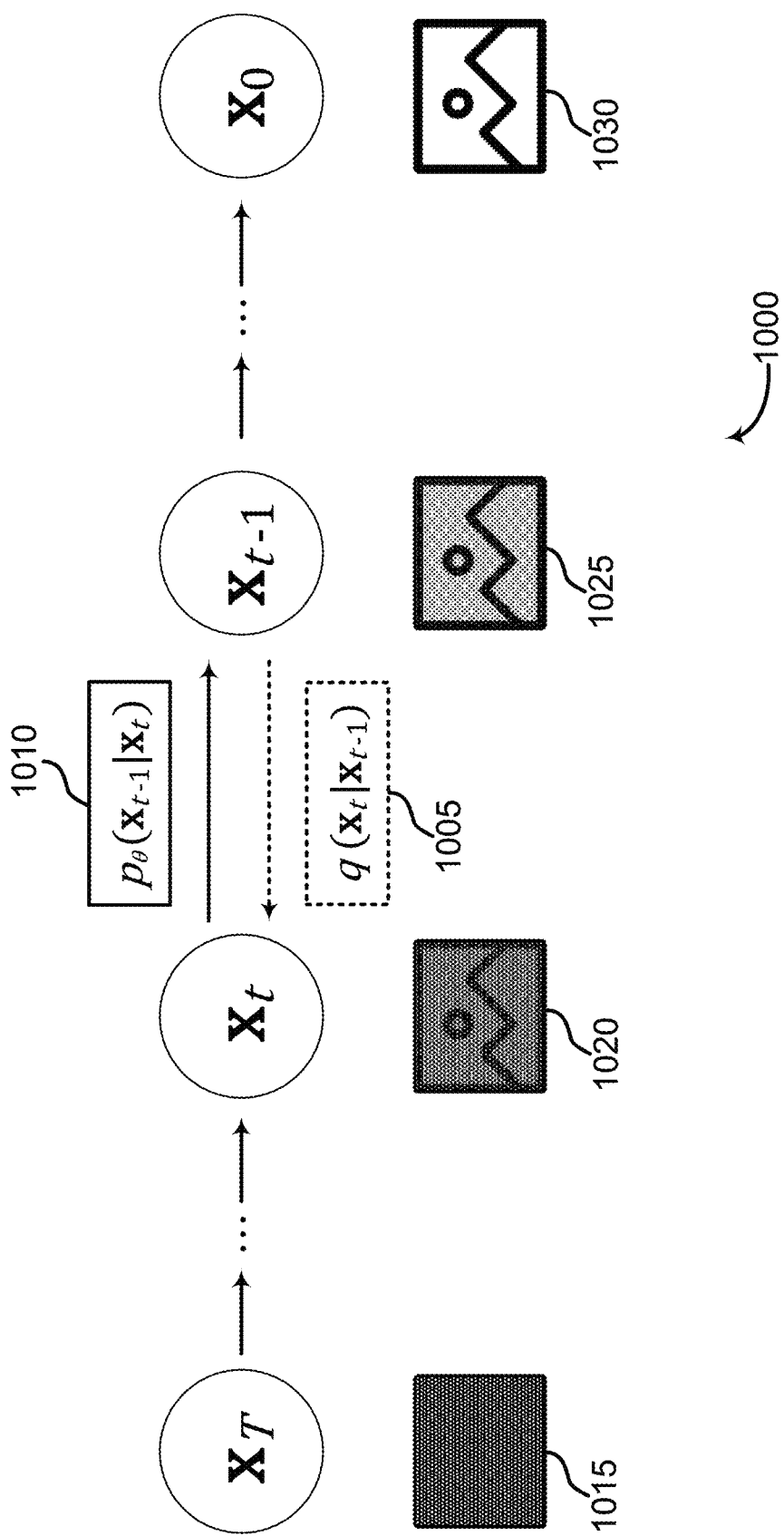
FIG. 10 shows an example of diffusion processes according to aspects of the present disclosure.

FIG. 10 shows an example of diffusion processes 1000 according to aspects of the present disclosure. The example shown includes forward diffusion process 1005 and reverse diffusion process 1010. In some cases, forward diffusion process 1005 adds noise to an image (or image features in a latent space). In some cases, reverse diffusion process 1010 denoises the image (or image features in the latent space) to obtain a denoised image.

According to some aspects, forward diffusion process 1005 iteratively adds Gaussian noise to an input at each diffusion step t according to a known variance schedule $0<\beta_1<\beta_2< \ldots <\beta_T<1$:

$$q(x_t|x_{t-1})= \mathcal{N}(x_t;\sqrt{1-\beta_t}x_{t-1},\beta_t I) \quad (3)$$

According to some aspects, the Gaussian noise is drawn from a Gaussian distribution with mean $\mu_t=\sqrt{1-\beta_t}x_{t-1}$ and variance $\sigma^2=\beta_t\geq 1$ by sampling $\in\sim \mathcal{N}(0,I)$ and setting $x_t=\sqrt{1-\beta_t}x_{t-1}+\sqrt{\beta_t}\in$. Accordingly, beginning with an initial input $x_0$, forward diffusion process 1005 produces $x_1, \ldots, x_t, \ldots x_T$, where $x_T$ is pure Gaussian noise. In some cases, as the noising data $\hat{x}$ is iteratively combined with $x_0$ and the mask at each step t as described with reference to FIG. 8, $x_T$ is the partially noisy image map $\hat{x}$, wherein the pure Gaussian noise is confined to the first region corresponding to the mask region of the mask.

For example, in some cases, a pre-processing component described with reference to FIGS. 4 and 7 or a training component described with reference to FIG. 4 maps an observed variable $x_0$ in either a pixel space or a latent space (such as original image 1030) to intermediate variables $x_1, \ldots, x_T$ using a Markov chain, where the intermediate variables $x_1, \ldots, x_T$ have a same dimensionality as the observed variable $x_0$. In some cases, the Markov chain gradually add Gaussian noise to the observed variable $x_0$ or to the intermediate variables $x_1, \ldots, x_T$, respectively, as the variables are passed through the ANN to obtain an approximate posterior $q(x_{1:T}|x_0)$.

According to some aspects, during reverse diffusion process 1010, a diffusion model such as the diffusion model described with reference to FIGS. 4, 5, and 7 gradually removes noise from $x_T$ to obtain a prediction of the observed variable $x_0$ (e.g., a representation of what the diffusion model thinks the original image 1030 should be). A conditional distribution $p(x_{t-1}|x_t)$ of the observed variable $x_0$ is unknown to the diffusion model, however, as calculating the conditional distribution would require a knowledge of a distribution of all possible images. Accordingly, the diffusion model is trained to approximate (e.g., learn) a conditional probability distribution $p_\theta(x_{t-1}|x_t)$ of the conditional distribution $p(x_{t-1}|x_t)$:

$$p_\theta(x_{t-1}|x_t)= \mathcal{N}(x_{t-1};\mu_\theta(x_t,t),\Sigma_\theta(x_t,t)) \quad (4)$$

In some cases, a mean of the conditional probability distribution $p_\theta(x_{t-1}|x_t)$ is parameterized by $\mu_\theta$ and a variance of the conditional probability distribution $p_\theta(x_{t-1}|x_t)$ is parameterized by $\Sigma_\theta$. In some cases, the mean and the variance are conditioned on a noise level t (e.g., an amount of noise corresponding to a diffusion step t). According to some aspects, the diffusion model is trained to learn the mean and/or the variance.

According to some aspects, the diffusion model initiates reverse diffusion process 1010 with noisy data $x_T$ (such as noisy image 1015). In some cases, noisy data $x_T$ is a partially noisy image map $\hat{x}$, wherein the noise is confined to the first region corresponding to the mask region. According to some aspects, the diffusion model iteratively denoises the noisy data $x_T$ to obtain the conditional probability distribution $p_\theta(x_{t-1}|x_t)$. For example, in some cases, at each step t−1 of reverse diffusion process 1010, the diffusion model takes $x_t$ (such as first intermediate image 1020) and t as input, where t represents a step in a sequence of transitions associated with different noise levels, and iteratively outputs a prediction of $x_{t-1}$ (such as second intermediate image 1025) until the noisy data $x_T$ is reverted to a prediction of the observed variable $x_0$ (e.g., a predicted image for original image 1030).

In some cases, for example, the diffusion model gradually removes noise from a noisy region of the partially noisy image map $\hat{x}$ until the composite image map (e.g., a predicted composite image map for a composite image corresponding to $x_0$ and the prompt) is obtained. In some cases, the diffusion model gradually removes the noise based on added denoising data to obtain the intermediate composite image maps as described with reference to FIG. 8.

According to some aspects, the addition of the denoising data corresponds to data added in a prediction of the move from $x_t$ to $x_{t-1}$ during reverse diffusion process 1010, and the intermediate composite image maps correspond to $x_t$ and $x_{t-1}$. In some cases, at each reverse diffusion step t, the diffusion model predicts the intermediate diffusion maps based on a prompt, a mask, and a mask type, as described with reference to FIG. 11.

According to some aspects, a joint probability of a sequence of samples in the Markov chain is determined as a product of conditionals and a marginal probability:

$$x_T \cdot p_\theta(x_{0:T}):=p(x_T)\Pi_{t=1}^T p_\theta(x_{t-1}|x_t) \quad (5)$$

In some cases, $p(x_T)= \mathcal{N}(x_T;0,I)$ is a pure noise distribution, as reverse diffusion process 1010 takes an outcome of forward diffusion process 1005 (e.g., a sample of pure noise $x_T$) as input, and $\Pi_{t=1}^T p_\theta(x_{t-1}|x_t)$ represents a sequence of Gaussian transitions corresponding to a sequence of addition of Gaussian noise to a sample.

Figure 11:
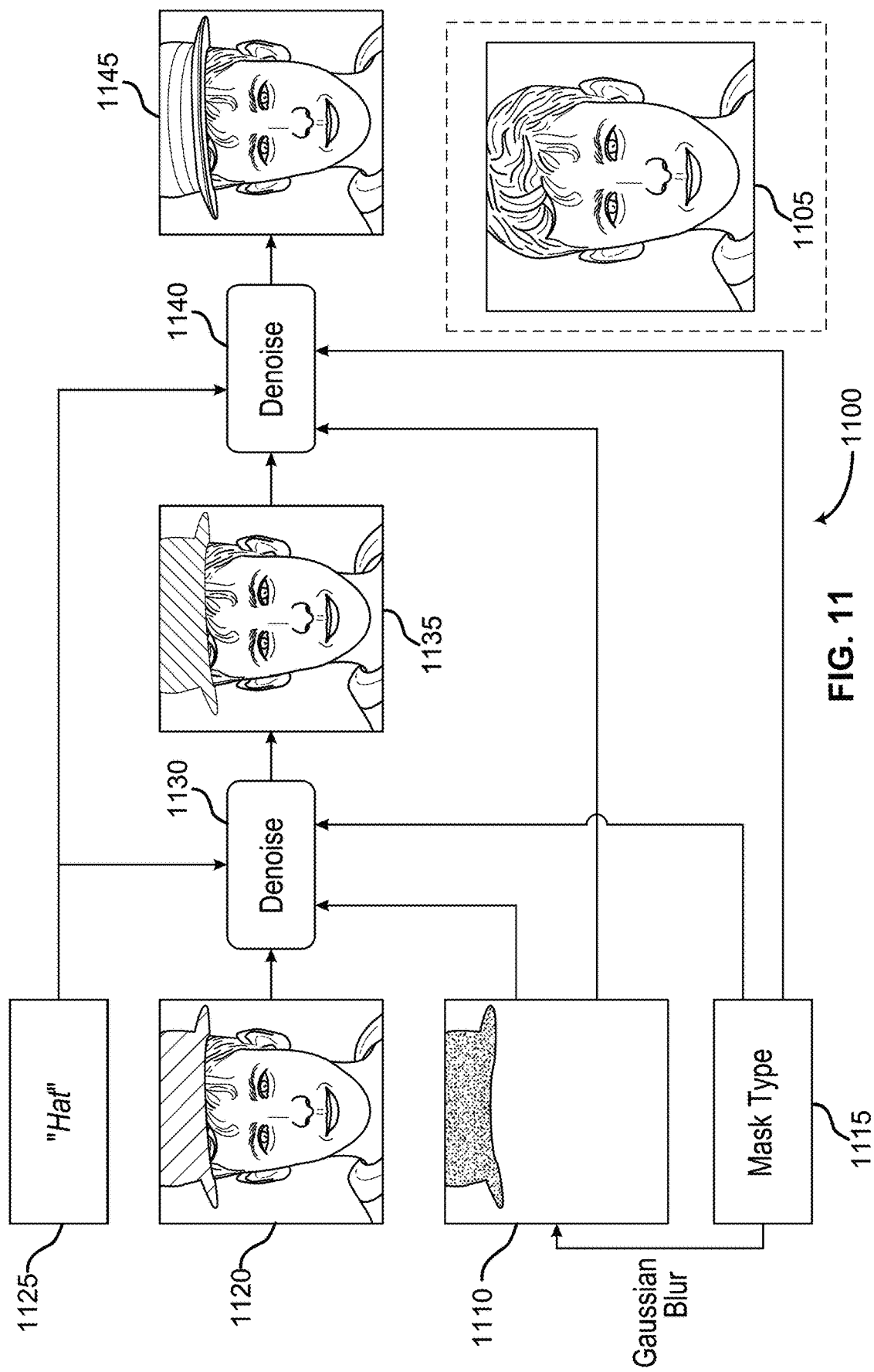
FIG. 11 shows an example of a denoising process according to aspects of the present disclosure.

FIG. 11 shows an example of denoising process 1100 according to aspects of the present disclosure. The example shown includes first denoising step 1130 and second denoising step 1140. Denoising process 1100 is an example of, or includes aspects of, a reverse diffusion process described with reference to FIGS. 5, 8, 10, 12, or 13.

Referring to FIG. 11, a user provides image 1105, mask 1110, mask level 1115, and prompt 1125 via a user interface as described with reference to FIG. 8, where mask level 1115 dictates an amount of Gaussian blur applied to a preliminary mask to obtain mask 1110 and prompt 1125 describes an element to be added to the image in a region corresponding to a mask region of mask 1110. A pre-processing component generates partially noisy image map 1120 based on image 1105, mask 1110, and prompt 1125 as described with reference to FIG. 8. In some cases, mask type 1115 is omitted from denoising process 1100.

During first denoising step 1130, a diffusion model generates intermediate composite image map 1135 by adding denoising data to partially noisy image map 1120 based on prompt 1125, mask 1110, and mask type 1115 to obtain intermediate composite image map 1135, as described with reference to FIGS. 8 and 10. In some cases, intermediate composite image map 1135 is an intermediate prediction of an image map that comprises image 1105 combined with an element described by prompt 1125 (e.g., "hat") comprised in a region provided by mask 1110. As shown in FIG. 11, intermediate composite image map 1120 includes different noise in the mask region than partially noisy image map 1120.

The diffusion model iteratively repeats first denoising step 1130 to obtain successive intermediate composite image maps until second denoising step 1140 is performed. During second denoising step 1140, the diffusion model finally outputs composite image map 1145. As shown in FIG. 11, composite image map 1145 comprises the element in a first region corresponding to the mask region of mask 1110, and features of image 1105 in a second region corresponding to the non-mask region of mask 1110. For example, composite image map 1145 comprises a hat with boundaries corresponding to the mask region of mask 1110 superimposed on a man depicted in image 1105.

Training

A method for multi-modal image editing is described with reference to FIGS. 12-13. One or more aspects of the method include identifying segmentation training data including an image depicting an element, a prompt identifying the element, and a mask indicating a region of the image that includes the element; generating a partially noisy image map that includes noise in a first region that corresponds to the mask and image features from the image in a second region that does not correspond to the mask; generating a composite image map using a diffusion model based on the partially noisy image map and the prompt, wherein the composite image map depicts the element in the first region that corresponds to the mask; comparing the composite image map to the image; and training the diffusion model by updating parameters of the diffusion model based on the comparison.

Some examples of the method further include generating the mask and the prompt identifying the element based on segmentation data for the image. Some examples of the method further include computing a reconstruction loss based on the composite image map and the image, wherein the parameters of the diffusion model are updated based on the reconstruction loss. In some aspects, the reconstruction loss is only applied to the first region that corresponds to the mask.

Some examples of the method further include identifying a pretrained diffusion model. Some examples further include fine-tuning the pretrained diffusion model based on the segmentation training data and on caption training data to obtain the diffusion model. Some examples of the method further include adding a channel to the pretrained diffusion model corresponding to the mask, wherein the diffusion model is fine-tuned based on the added channel.

Some examples of the method further include encoding the image to obtain an image feature map, wherein the partially noisy image map is based on the image feature map. Some examples further include decoding the composite image map to obtain a composite image.

Figure 12:
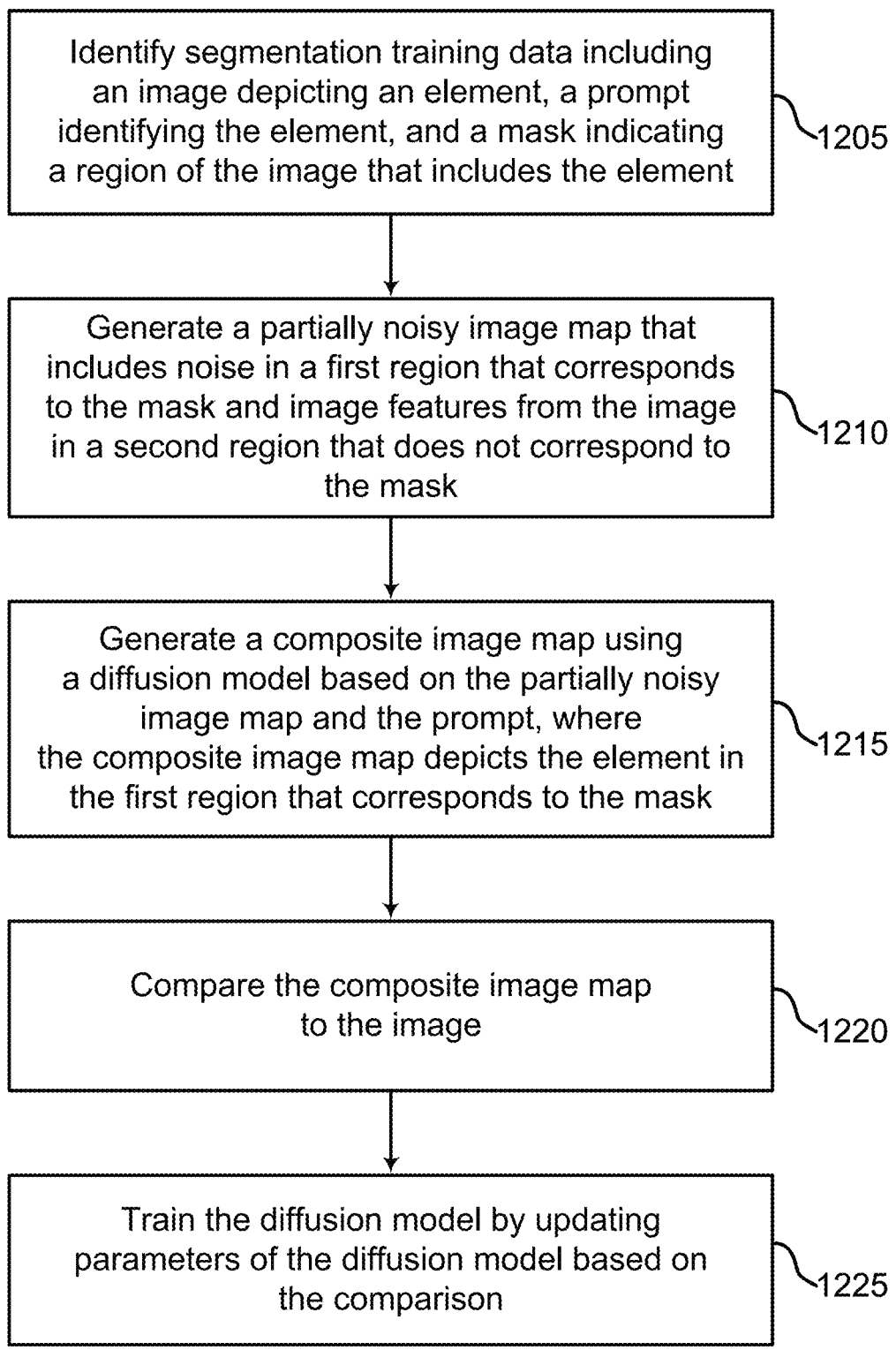
FIG. 12 shows an example of a method for training a diffusion model according to aspects of the present disclosure.

FIG. 12 shows an example of a method 1200 for training a diffusion model according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 12, the system trains a diffusion model to generate a composite image map based on an image, a mask, and a prompt as described with reference to FIG. 8.

At operation 1205, the system identifies segmentation training data including an image depicting an element, a prompt identifying the element, and a mask indicating a region of the image that includes the element. In some cases, the operations of this step refer to, or may be performed by, a training component as described with reference to FIG. 4.

According to some aspects, "segmentation" training data denotes that components of the training data are labeled and are therefore known to the training component. For example, in some cases, the segmentation training data includes a label identifying the element and a class label for the prompt. In some cases, the training component identifies the segmentation training data in response to an instruction provided by a user. In some cases, the training component retrieves the segmentation training data from a database as described with reference to FIG. 1.

According to some aspects, the training component generates the mask (or a preliminary mask) and the prompt identifying the element based on segmentation data for the image. For example, in some cases, segmentation data included in the segmentation training data comprises a boundary of the element. In some cases, an ANN of the training component (such as a Mask-R-CNN network) generates a mask (or a preliminary mask) for the image and the prompt for the element based on the boundary of the element included in the segmentation data. In some examples, the ANN generates a class label for the prompt.

According to some aspects, the training component generates the mask by applying Gaussian blur to a preliminary mask according to a mask type as described with reference to FIG. 8. In some cases, the training component retrieves the preliminary mask from a database as described with reference to FIG. 1. In some cases, the training component generates the preliminary mask based on the segmentation data. According to some aspects, the training component includes the mask type in the segmentation training data.

At operation 1210, the system generates a partially noisy image map that includes noise in a first region that corresponds to the mask and image features from the image in a second region that does not correspond to the mask. In some cases, the operations of this step refer to, or may be performed by, a training component as described with reference to FIG. 4. For example, in some cases, the training component performs the forward diffusion process performed as described with reference to FIGS. 5, 8, and 10 to obtain the partially noisy image map $\tilde{x}$.

In some cases, the training component provides the image to an encoder described with reference to FIGS. 4 and 7. In some cases, the encoder encodes the image to obtain an image feature map as described with reference to FIGS. 7 and 8. In some cases, encoder provides the image feature map to the training component. In some cases, the partially noisy image map is generated based on the image feature map as described with reference to FIG. 8.

At operation 1215, the system generates a composite image map using a diffusion model based on the partially noisy image map and the prompt, where the composite image map depicts the element in the first region that corresponds to the mask. In some cases, the operations of this step refer to, or may be performed by, a diffusion model as described with reference to FIGS. 4 and 7.

According to some aspects, the training component pretrains the diffusion model based on image caption training data to perform the reverse diffusion process described with reference to FIGS. 5, 8, 10, and 11. For example, the training component pretrains the diffusion model as described with reference to FIG. 13. According to some aspects, the training component implements the pretrained diffusion model as the diffusion model.

According to some aspects, the diffusion model performs the reverse diffusion process described with reference to FIGS. 5, 10, and 11 to generate the composite image map. In some cases, during the reverse diffusion process, the diffusion model receives the mask, the mask type, the class label, or a combination thereof as a denoising guidance input at each reverse diffusion step.

At operation 1220, the system compares the composite image map to the image. In some cases, the operations of this step refer to, or may be performed by, a training component as described with reference to FIG. 4. In some cases, the diffusion model provides the composite image map, the intermediate composite image map, or a combination thereof to the training component. The training component compares the composite image map, the intermediate composite image map, or a combination thereof to the image.

At operation 1225, the system trains the diffusion model by updating parameters of the diffusion model based on the comparison. In some cases, the operations of this step refer to, or may be performed by, a training component as described with reference to FIG. 4.

According to some aspects, the training component computes a reconstruction loss $\mathcal{L}$ based on the composite image map and the image according to a reconstruction loss function:

$$\mathcal{L} = \|\in \odot m - \in_0(\tilde{x}, m, mt, \text{text}, t) \odot m\|_2^2, \quad (6)$$

where $\in$ is pure noise sampled at diffusion step t, m is the mask, $\in_0(\cdot)$ is the diffusion model, mt is the mask type, and text is the prompt as described with reference to FIG. 8.

The term "loss function" refers to a function that impacts how a machine learning model is trained in a supervised learning model. Specifically, during each training iteration, the output of the model is compared to the known annotation information in the training data. The loss function provides a value (a "loss") for how close the predicted annotation data is to the actual annotation data. After computing the loss, the parameters of the model are updated accordingly and a new set of predictions are made during the next iteration.

Supervised learning is one of three basic machine learning paradigms, alongside unsupervised learning and reinforcement learning. Supervised learning is a machine learning technique based on learning a function that maps an input to an output based on example input-output pairs. Supervised learning generates a function for predicting labeled data based on labeled training data consisting of a set of training examples. In some cases, each example is a pair consisting of an input object (typically a vector) and a desired output value (i.e., a single value, or an output vector). A supervised learning algorithm analyzes the training data and produces the inferred function, which can be used for mapping new examples. In some cases, the learning results in a function that correctly determines the class labels for unseen instances. In other words, the learning algorithm generalizes from the training data to unseen examples.

According to some aspects, the diffusion model provides the composite image map to a decoder described with reference to FIGS. 4 and 7. In some cases, the decoder decodes the composite image map to obtain a composite image as described with reference to FIG. 7. In some cases, the training component computes the reconstruction loss $\mathcal{L}$ based on comparing the composite image to the image.

According to some aspects, the training component updates parameters of the diffusion model based on the reconstruction loss $\mathcal{L}$ using a mean squared error between the composite image map and the image. In some cases, the training component only applies the reconstruction loss $\mathcal{L}$ to the first region that corresponds to the mask.

According to some aspects, the training component fine-tunes the diffusion model according to the reconstruction loss $\mathcal{L}$. For example, in some cases, the training component adds a channel to the pretrained diffusion model corresponding to the mask, where the diffusion model is fine-tuned based on the added channel.

According to some aspects, by training the diffusion model based on the partially noisy image data $\tilde{x}$ (which, in some cases, only includes noise in the first region, and includes an un-noised region corresponding to the image) and the mask, the diffusion model learns to realistically incorporate the element with the image in the composite image map, thereby accomplishing image inpainting in which the element is visually compatible with the remainder of the composite image map.

Figure 13:
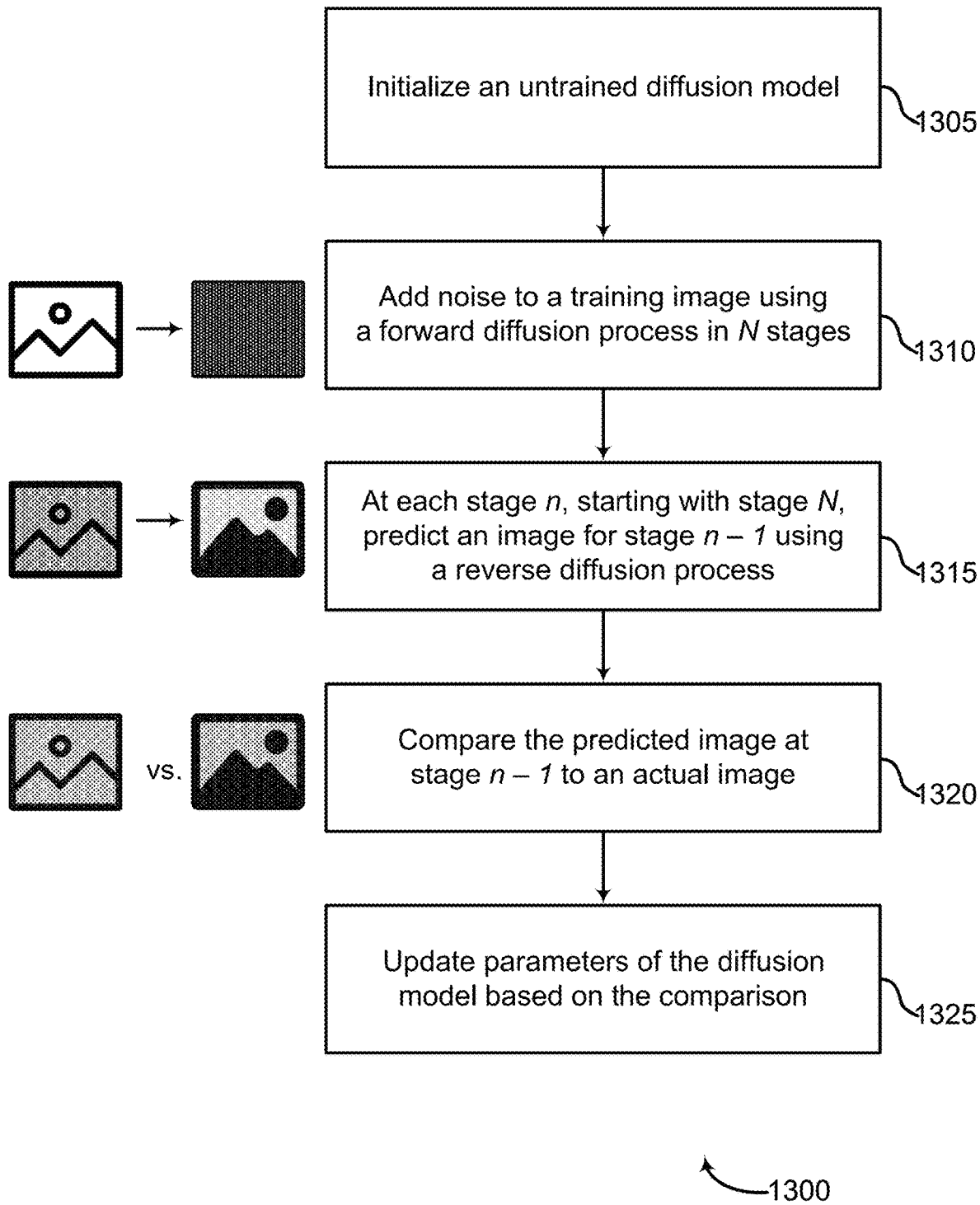
FIG. 13 shows an example of a method for pretraining a diffusion model according to aspects of the present disclosure.

FIG. 13 shows an example of a method 1300 for pretraining training a diffusion model via forward and reverse diffusion according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 13, the system pretrains an untrained diffusion model to implement the pretrained diffusion model as the diffusion model used in the training process described with reference to FIG. 12.

At operation 1305, the system initializes an untrained diffusion model. In some cases, the operations of this step refer to, or may be performed by, a training component as described with reference to FIG. 4. In some cases, the initialization includes defining the architecture of the untrained diffusion model and establishing initial values for parameters of the untrained diffusion model. In some cases, the training component initializes the untrained diffusion model to implement a U-Net architecture described with reference to FIG. 6. In some cases, the initialization includes defining hyper-parameters of the architecture of the untrained diffusion model, such as a number of layers, a resolution and channels of each layer block, a location of skip connections, and the like.

At operation 1310, the system adds noise to a training image using a forward diffusion process in N stages. In some cases, the operations of this step refer to, or may be performed by, a training component as described with reference to FIG. 4. In some cases, the training component retrieves image caption training data from a database, such as the database described with reference to FIG. 1. In some cases, the training component adds noise to a training image included in the image caption training data using a forward diffusion process described with reference to FIG. 10.

At operation 1415, at each stage n, starting with stage N, the system predicts an image for stage n−1 using a reverse diffusion process. In some cases, the operations of this step refer to, or may be performed by, the untrained diffusion model. According to some aspects, the untrained diffusion model performs a reverse diffusion process as described with reference to FIG. 10, where each stage n corresponds to a diffusion step t, to predict noise that was added by the forward diffusion process. In some cases, at each stage, the untrained diffusion model predicts noise that can be removed from an intermediate image to obtain the predicted image. In some cases, an original image is predicted at each stage of the training process.

At operation 1420, the system compares the predicted image at stage n−1 to an actual image (or image features), such as the image at stage n−1 or the original input image. In some cases, the operations of this step refer to, or may be performed by, a training component as described with reference to FIG. 4. For example, given observed data x, the training component trains the untrained diffusion model to minimize a variational upper bound of a negative log-likelihood −log $p_\theta(x)$ of the image caption training data.

At operation 1425, the system updates parameters of the untrained diffusion model based on the comparison. In some cases, the operations of this step refer to, or may be performed by, a training component as described with reference to FIG. 4. For example, in some cases, the training component updates parameters of the U-Net using gradient descent. In some cases, the training component trains the U-Net to learn time-dependent parameters of the Gaussian transitions. Accordingly, by updating parameters of the untrained diffusion model, the training component obtains a pretrained diffusion model.

Figure 14:
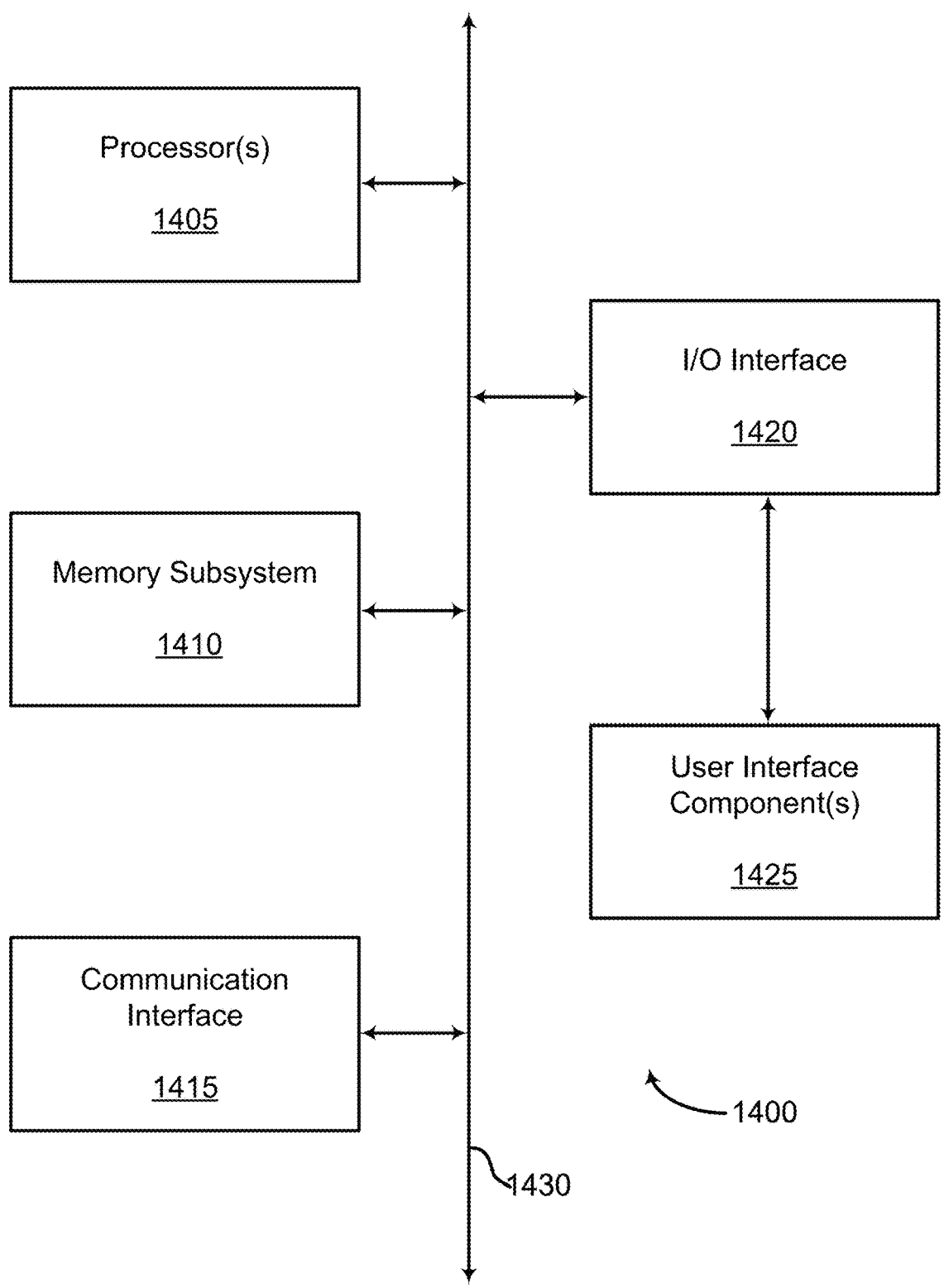
FIG. 14 shows an example of a computing device according to aspects of the present disclosure.

FIG. 14 shows an example of a computing device 1400 for multi-modal image editing according to aspects of the present disclosure. In one aspect, computing device 1400 includes processor(s) 1405, memory subsystem 1410, communication interface 1415, I/O interface 1420, user interface component(s) 1425, and channel 1430.

In some embodiments, computing device 1400 is an example of, or includes aspects of, the image editing apparatus as described with reference to FIGS. 1, 4, and 7. In some embodiments, computing device 1400 includes one or more processors 1405 that can execute instructions stored in memory subsystem 1410 to identify an image, a prompt identifying an element to be added to the image, and a mask indicating a region of the image for depicting the element; generate a partially noisy image map that includes noise in a first region that corresponds to the mask and image features from the image in a second region that does not correspond to the mask; and generate a composite image map using a diffusion model based on the partially noisy image map and the prompt, wherein the composite image map includes the element in the first region that corresponds to the mask.

According to some aspects, computing device 1400 includes one or more processors 1405. In some cases, a processor is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or a combination thereof. In some cases, a processor is configured to operate a memory array using a memory controller. In other cases, a memory controller is integrated into a processor. In some cases, a processor is configured to execute computer-readable instructions stored in a memory to perform various functions. In some embodiments, a processor includes special purpose components for modem processing, baseband processing, digital signal processing, or transmission processing.

According to some aspects, memory subsystem 1410 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

According to some aspects, communication interface 1415 operates at a boundary between communicating entities (such as computing device 1400, one or more user devices, a cloud, and one or more databases) and channel 1430 and can record and process communications. In some cases, communication interface 1415 is provided to enable a processing system coupled to a transceiver (e.g., a transmitter and/or a receiver). In some examples, the transceiver is configured to transmit (or send) and receive signals for a communications device via an antenna.

According to some aspects, I/O interface 1420 is controlled by an I/O controller to manage input and output signals for computing device 1400. In some cases, I/O interface 1420 manages peripherals not integrated into computing device 1400. In some cases, I/O interface 1420 represents a physical connection or port to an external peripheral. In some cases, the I/O controller uses an operating system such as iOS®, ANDROID®, MS-DOS®, MS-WINDOWS®, OS/2®, UNIX®, LINUX®, or other known operating system. In some cases, the I/O controller represents or interacts with a modem, a keyboard, a mouse, a touchscreen, or a similar device. In some cases, the I/O controller is implemented as a component of a processor. In some cases, a user interacts with a device via I/O interface 1420 or via hardware components controlled by the I/O controller.

According to some aspects, user interface component(s) 1425 enable a user to interact with computing device 1400. In some cases, user interface component(s) 1425 include an audio device, such as an external speaker system, an external display device such as a display screen, an input device (e.g., a remote control device interfaced with a user interface directly or through the I/O controller), or a combination thereof. In some cases, user interface component(s) 1425 include a GUI.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for image editing, comprising:
identifying, by a processor, an image, a prompt identifying an element to be added to the image, a preliminary mask, and a mask precision indicator;
expanding, by the processor, the preliminary mask based on the mask precision indicator to obtain a mask indicating a first region of the image for depicting the element;
generating, by the processor, a partially noisy image map that includes noise in the first region and image features from the image in a second region outside the first region; and
generating, by the processor, a composite image map using a diffusion model based on the partially noisy image map and the prompt, wherein the composite image map includes the element in the first region that corresponds to the mask.

2. The method of claim 1, further comprising:
receiving a brush tool input from a user; and
generating the preliminary mask based on the brush tool input.

3. The method of claim 1, further comprising:
encoding the image to obtain an image feature map, wherein the partially noisy image map is based on the image feature map; and
decoding the composite image map to obtain a composite image.

4. The method of claim 1, further comprising:
generating a predicted mask for the element based on the composite image map; and
combining the image and the composite image map based on the predicted mask.

5. The method of claim 1, further comprising:
providing the mask as an input to the diffusion model.

6. The method of claim 1, further comprising:
generating intermediate denoising data using the diffusion model; and
combining the intermediate denoising data with the partially noisy image map to obtain an intermediate composite image map.

7. A system comprising:
a memory component; and
a processing device coupled to the memory component, the processing device configured to perform operations comprising:
identifying an image, a prompt identifying an element to be added to the image, a preliminary mask, and a mask precision indicator;
expanding the preliminary mask based on the mask precision indicator to obtain a mask indicating a first region of the image for depicting the element;
generating a partially noisy image map that includes noise in the first region and image features from the image in a second region outside the first region; and
generating a composite image map using a diffusion model based on the partially noisy image map and the prompt, wherein the composite image map includes the element in the first region that corresponds to the mask.

8. The system of claim 7, further comprising:
a user interface that includes a brush tool for generating the mask and a precision control element for obtaining a mask precision indicator.

9. The system of claim 7, wherein:
the diffusion model is further configured to generate image features based on the image, and decode the composite image map to obtain a composite image.

10. The system of claim 7, wherein:
the diffusion model comprises a U-Net architecture.

11. The system of claim 7, wherein:
the diffusion model comprises a channel corresponding to the mask.

12. The system of claim 7, the processing device being further configured to perform operations comprising:
generating a predicted mask based on the composite image map using a mask network.

13. A non-transitory computer readable medium storing code for data processing, the code comprising instructions that, when executed by at least one processor, cause the at least one processor to perform operations comprising:
identifying an image, a prompt identifying an element to be added to the image, a preliminary mask, and a mask precision indicator;
expanding the preliminary mask based on the mask precision indicator to obtain a mask indicating a first region of the image for depicting the element;
generating a partially noisy image map that includes noise in the first region and image features from the image in a second region outside the first region; and
generating a composite image map using a diffusion model based on the partially noisy image map and the prompt, wherein the composite image map includes the element in the first region that corresponds to the mask.

14. The non-transitory computer readable medium of claim 13, the code further comprising instructions that, when executed by the at least one processor, cause the at least one processor to perform operations comprising:
receiving a brush tool input from a user; and
generating the preliminary mask based on the brush tool input.

15. The non-transitory computer readable medium of claim 13, the code further comprising instructions that, when executed by the at least one processor, cause the at least one processor to perform operations comprising:
encoding the image to obtain an image feature map, wherein the partially noisy image map is based on the image feature map; and
decoding the composite image map to obtain a composite image.

16. The non-transitory computer readable medium of claim 13, the code further comprising instructions that, when executed by the at least one processor, cause the at least one processor to perform operations comprising:
generating a predicted mask for the element based on the composite image map; and
combining the image and the composite image map based on the predicted mask.

17. The non-transitory computer readable medium of claim 13, the code further comprising instructions that, when executed by the at least one processor, cause the at least one processor to perform operations comprising:
providing the mask as an input to the diffusion model.

18. The non-transitory computer readable medium of claim 13, the code further comprising instructions that, when executed by the at least one processor, cause the at least one processor to perform operations comprising:
generating intermediate denoising data using the diffusion model; and
combining the intermediate denoising data with the partially noisy image map to obtain an intermediate composite image map.

* * * * *